(12) United States Patent
Bonsall

(10) Patent No.: US 7,028,638 B2
(45) Date of Patent: Apr. 18, 2006

(54) ANIMAL TRANSPORTATION AND TRACKING SYSTEM

(76) Inventor: Sandie W. Bonsall, 12349 118th Rd., Minneola, KS (US) 67865

( * ) Notice: Subject to any disclaimer, the term of this patent is extended or adjusted under 35 U.S.C. 154(b) by 151 days.

(21) Appl. No.: 10/420,235

(22) Filed: Apr. 21, 2003

(65) Prior Publication Data

US 2004/0123811 A1   Jul. 1, 2004

Related U.S. Application Data

(63) Continuation-in-part of application No. 10/228,630, filed on Aug. 26, 2002, and a continuation-in-part of application No. 09/925,253, filed on Aug. 8, 2001, now Pat. No. 6,537,016, and a continuation-in-part of application No. 09/717,727, filed on Nov. 20, 2000, now Pat. No. 6,439,825.

(51) Int. Cl.
  *A01K 15/02*   (2006.01)
  *A01K 3/00*   (2006.01)
(52) U.S. Cl. ..................... 119/400; 119/721
(58) Field of Classification Search .............. 119/400, 119/405, 720, 712, 721, 840, 843, 841, 842, 119/412, 14.03, 14.08, 14.11
See application file for complete search history.

(56) References Cited

U.S. PATENT DOCUMENTS

| 1,266,375 | A | * | 5/1918 | Adams ..................... 119/412 |
| 2,228,946 | A | * | 1/1941 | Carter ..................... 414/537 |
| 4,617,876 | A | * | 10/1986 | Hayes ..................... 119/842 |
| 5,644,643 | A | * | 7/1997 | Scofield et al. ............ 382/110 |
| 5,769,032 | A | * | 6/1998 | Yarnall et al. ............. 119/721 |
| 5,791,294 | A | * | 8/1998 | Manning ................... 119/721 |
| 5,959,526 | A | * | 9/1999 | Tucker .................... 340/572.1 |
| 6,135,055 | A | * | 10/2000 | Pratt ..................... 119/51.02 |
| 6,166,643 | A | * | 12/2000 | Janning et al. ........... 340/573.3 |
| 6,341,582 | B1 | * | 1/2002 | Gompper et al. .......... 119/840 |
| 6,581,546 | B1 | * | 6/2003 | Dalland et al. ............ 119/712 |
| 6,600,422 | B1 | * | 7/2003 | Barry et al. ............. 340/573.3 |
| 6,700,492 | B1 | * | 3/2004 | Touchton et al. ......... 340/573.1 |

* cited by examiner

*Primary Examiner*—Son T. Nguyen

(57) ABSTRACT

An animal transportation and tracking system for efficiently tracking and tracing livestock during transportation thereof. The inventive device includes a frame attached to a truck, a ramp attached to the frame that is extendable from the frame, a computer, a primary transceiver in communication with the computer, an animal transponder in communication with the primary transceiver, a secondary transceiver in communication with the computer, and a position localizer in communication with the secondary transceiver.

1 Claim, 24 Drawing Sheets

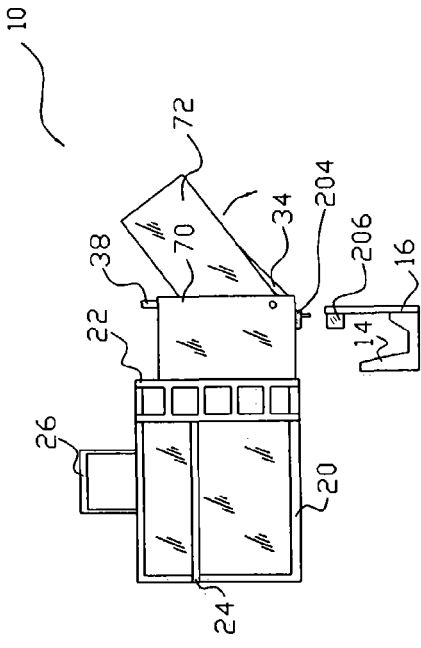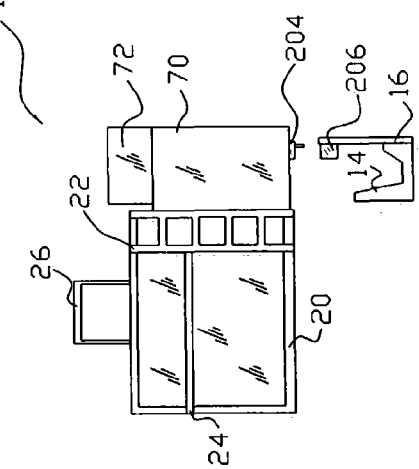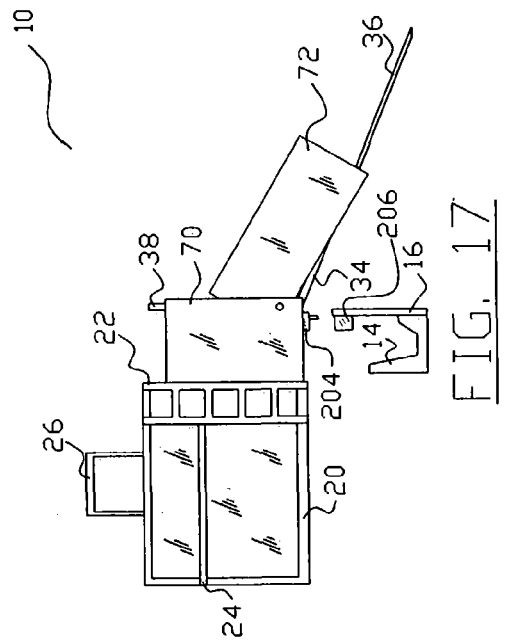

ANIMAL TRANSPORTATION AND TRACKING SYSTEM

CROSS REFERENCE TO RELATED APPLICATIONS

This is a Request for filing a continuation-in-part application under 37 CFR 1.20 of prior application Ser. No. 09/717,727 filed on Nov. 20, 2000, entitled "Animal Transporting System"(issued into U.S. Pat. No. 6,439,825 on Aug. 27, 2002), Ser. No. 09/925,253 filed on Aug. 8, 2001, entitled "Animal Transportation System"(issued into U.S. Pat. No. 6,537,016) and Ser. No. 10,228,630 filed Aug. 26, 2002, entitled "Animal Transporting System", by the following named inventor(s):

STATEMENT REGARDING FEDERALLY SPONSORED RESEARCH OR DEVELOPMENT

Not applicable to this application.

BACKGROUND OF THE INVENTION

1. Field of the Invention

The present invention relates generally to animal transporting devices and more specifically it relates to an animal transportation and tracking system for efficiently tracking and tracing livestock during transportation thereof.

2. Description of the Prior Art

Animal transporting devices have been in use for years. Typically, an animal transporting device is comprised of a ground or dock level trailer that is connected to a vehicle. Conventional animal trailers have a rear door exposing an interior portion having one or more gates for creating various sizes of holding pens for the animals.

Conventional animal trailers do not provide a system for efficiently managing and monitoring livestock during transportation thereof. Another problem is that feedyards often times lose livestock, due to mishandling and inaccurate documentation which results in a financial loss for the feedyard.

While these devices may be suitable for the particular purpose to which they address, they are not as suitable for efficiently managing livestock during transportation thereof. Conventional animal trailers are not efficient to utilize when loading and unloading one or more animals.

In these respects, the animal transportation and tracking system according to the present invention substantially departs from the conventional concepts and designs of the prior art, and in so doing provides an apparatus primarily developed for the purpose of efficiently managing livestock during transportation thereof.

SUMMARY OF THE INVENTION

In view of the foregoing disadvantages inherent in the known types of animal trailers now present in the prior art, the present invention provides a new animal transportation and tracking system construction wherein the same can be utilized for easily loading, unloading,- sorting, and transporting animals within an enclosed structure with the operator removed or on the exterior of said structure.

The general purpose of the present invention, which will be described subsequently in greater detail, is to provide a new animal transportation and tracking system that has many of the advantages of the animal transporting devices mentioned heretofore and many novel features that result in a new animal transportation and tracking system which is not anticipated, rendered obvious, suggested, or even implied by any of the prior art animal transporting devices, either alone or in any combination thereof.

To attain this, the present invention generally comprises a frame attached to a truck, a ramp attached to the frame that is extendable from the frame, a computer, a primary transceiver in communication with the computer, an animal transponder in communication with the primary transceiver, a secondary transceiver in communication with the computer, and a position localizer in communication with the secondary transceiver.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an animal transportation and tracking system that will overcome the shortcomings of the prior art devices.

A second object is to provide an animal transportation and tracking system for efficiently managing livestock during transportation thereof.

Another object is to provide an animal transportation and tracking system that allows for the maintenance of automatic records of animals that leave a trailer.

A further object is to provide an animal transportation and tracking system that allows for the loading and unloading of animals at ground level into the rear door thereof.

Another object is to provide an animal transportation and tracking system that does not require additional portable fences, ramps or chutes to load and unload animals from within the holding structure.

An additional object is to provide an animal transportation and tracking system that allows only one individual to load, unload, sort and transport animals.

A further object is to provide an animal transportation and tracking system that encourages free and natural movement of animals thereby requiring no outside stimulation such as electrical shockers.

Another object is to provide an animal transportation and tracking system that allows an individual to safely load, sort, separate, and unload animals.

A further object is to provide an animal transportation and tracking system that does not require an individual to enter the interior with the animals.

A further object is to provide an animal transportation and tracking system that simple in construction thereby creating a strong and durable structure.

A further object is to provide,an animal transportation and tracking system that can be utilized to load and unload animals within feed yard pens without requiring a gate to be opened.

A further object is to provide an animal transportation and tracking system that allows sick animals to be transported thereby reducing stress to the animal.

A further object is to provide an animal transportation and tracking system that reduces labor costs.

A further object is to provide an animal transportation and tracking system that can be utilized within feed yards, zoos and various other locations.

A further object is to provide an animal transportation and tracking system that will sort, deliver and return animals from hospital pens within a feedlot to their home pens.

A further object is to provide a low-stress, calm, humane way to transport sick and weakened animals with minimal interaction between animals and people.

A further object is to provide an animal transportation and tracking system that allows animals to be loaded and unloaded over gates, fences, feed bunks and various other structures.

A further object is to provide an animal transportation and tracking system that can load or unload animals at a dock.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 14 is a rear view with the first doors fully extended and the second doors in a retracted position.

FIG. 15 is a rear view of the present invention showing the second doors being extended with respect to the first doors.

FIG. 16 is a rear view of the present invention showing the second doors being extended with respect to the first doors.

FIG. 17 is a rear view of the present invention showing the second doors fully extended along side the ramp.

DESCRIPTION OF THE PREFERRED EMBODIMENT

Figure 1:
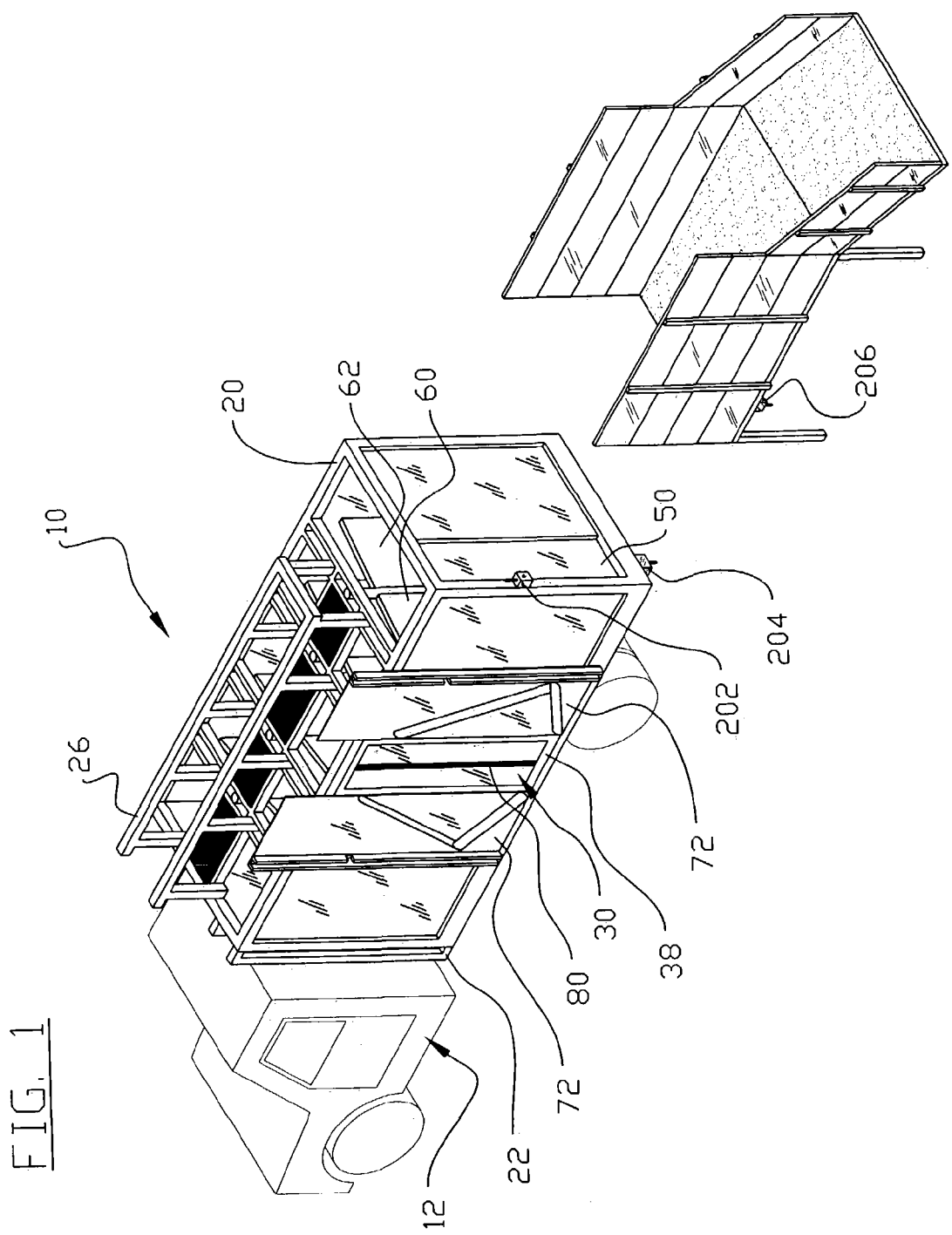
FIG. 1 is a rear upper perspective view of the present invention.

Turning now descriptively to the drawings, in which similar reference characters denote similar elements throughout the several views, FIGS. 1 through 31 illustrate an animal transportation and tracking system 10, which comprises a frame 20 attached to a truck 12, a ramp 30 attached to the frame 20 that is extendable from the frame 20, a pair of first doors 70 pivotally attached to the frame 20 adjacent the ramp 30, a pair of second doors 72 pivotally attached to the first doors 70, and a rear door 50, and a rear ramp structure telescoping rearwardly and downwardly for the loading of animals at ground level. When the ramp 30 is fully extended, the first doors 70, the deck 32, and the second doors 72 are extended from the frame 20 along side the ramp 30 for retaining animals being loaded and unloaded from the frame 20. The frame 20 is formed for receiving one or more animals within having a plurality of partitions 62 and inner doors 60. A side door 40 and a rear door 50 are positioned within the frame 20 for allowing loading and unloading animals from heightened areas such as a dock. A catwalk 26 attached to the upper portion of the frame 20 for allowing an individual to view the interior portion of the frame 20.

Figure 2:
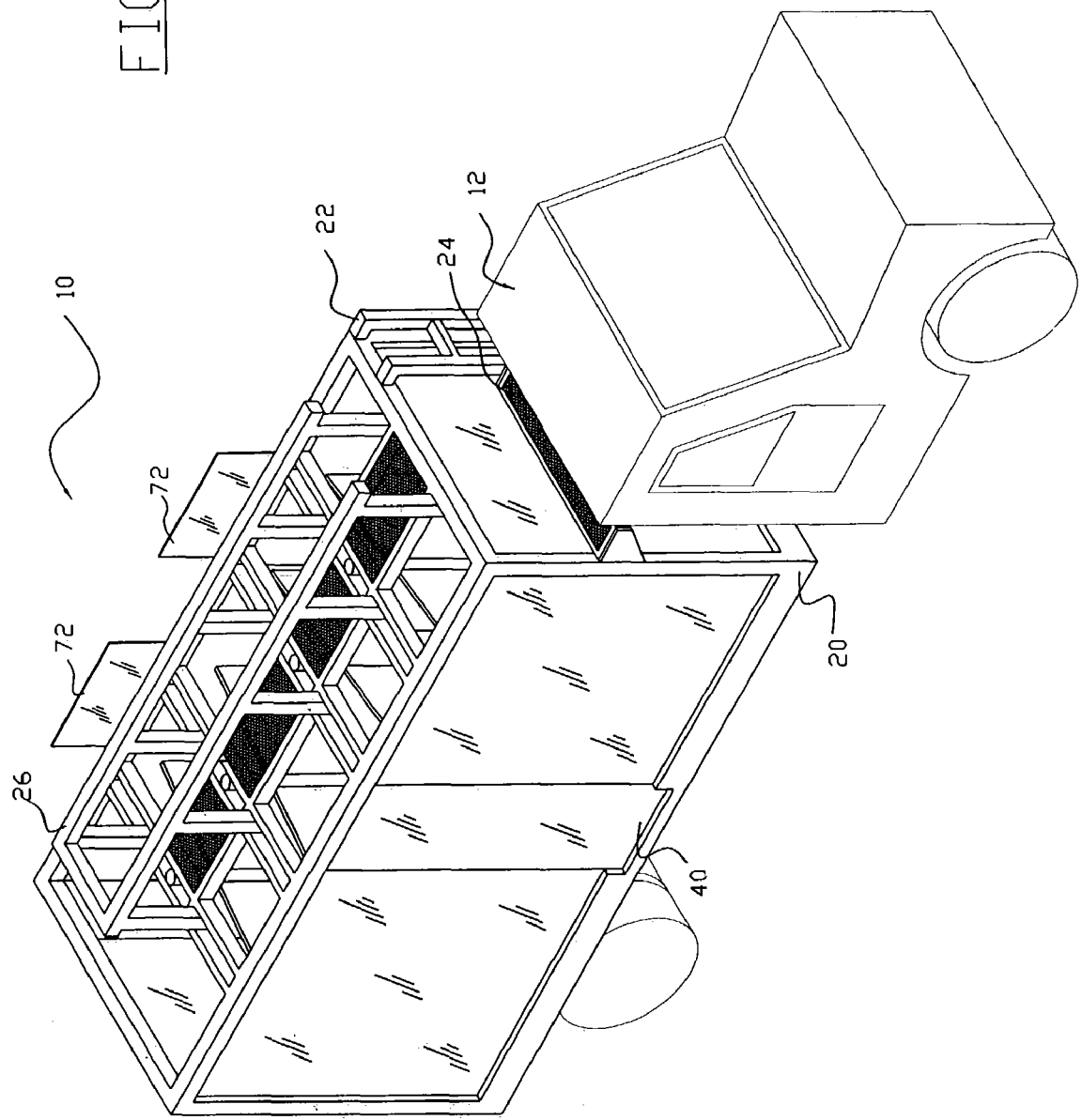
FIG. 2 is a front upper perspective view of the present invention.

As shown in FIGS. 1 and 2 of the drawings, a truck 12 or similar vehicle is provided to support the frame 20. The truck 12 may include various structures and designs as can be appreciated. The purpose of the truck 12 is to provide a self-powered device for transporting the animals contained within the structure of the frame 20. Further discussion of the truck 12 will not be pursued because the variations to the truck 12 are deemed readily apparent to one skilled in the art.

As shown in FIGS. 1 and 2 of the drawings, a frame 20 is provided that is attached to a rear portion of the truck 12. The frame 20 is self-enclosed for retaining one or more animals within. The frame 20 includes a plurality of walls that may be ventilated for the animals within. The frame 20 may be comprised of any shape, size and structure capable of receiving and storing one or more animals as can be appreciated.

Figure 3:
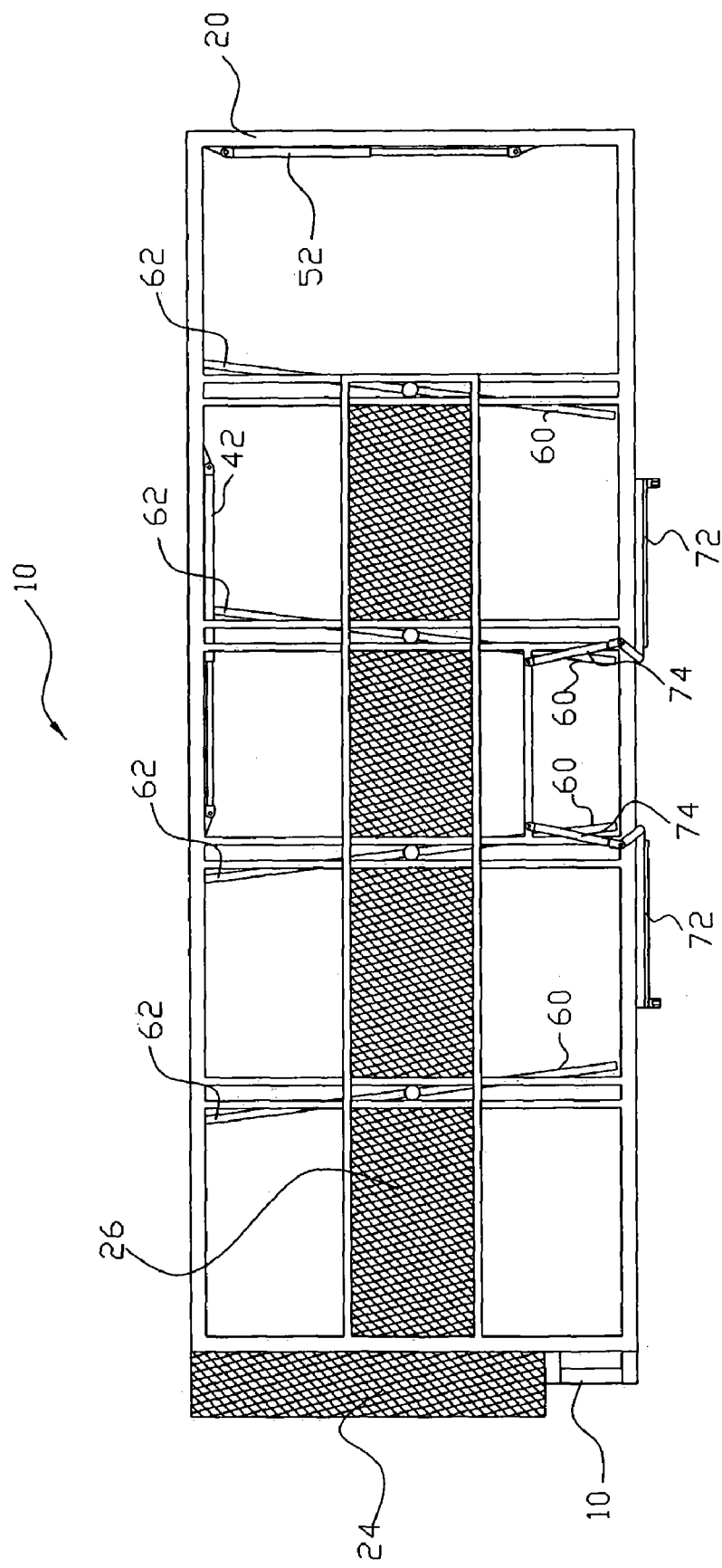
FIG. 3 is a top view of the present invention with the gates closed within.
Figure 4:
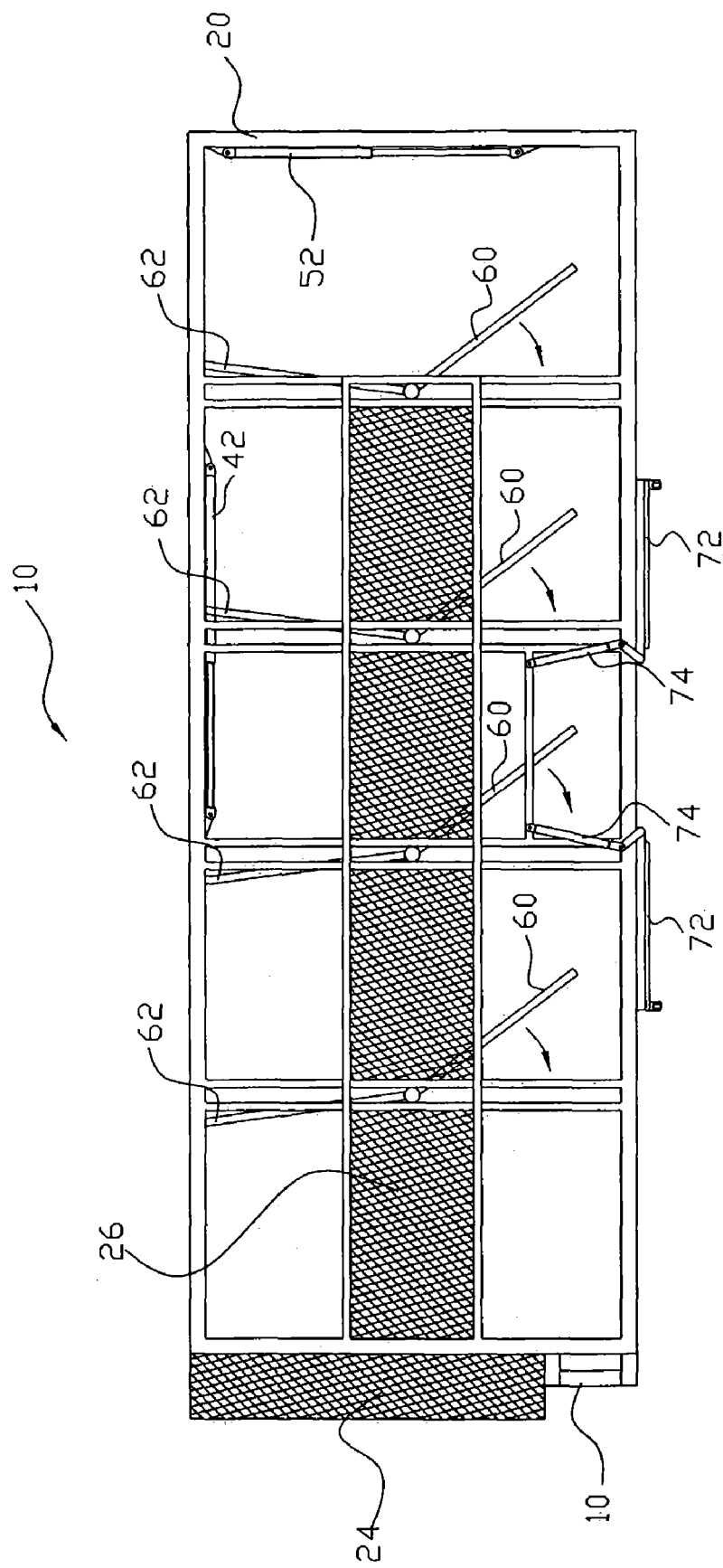
FIG. 4 is a top view of the present invention with the gates opened within.
Figure 5:
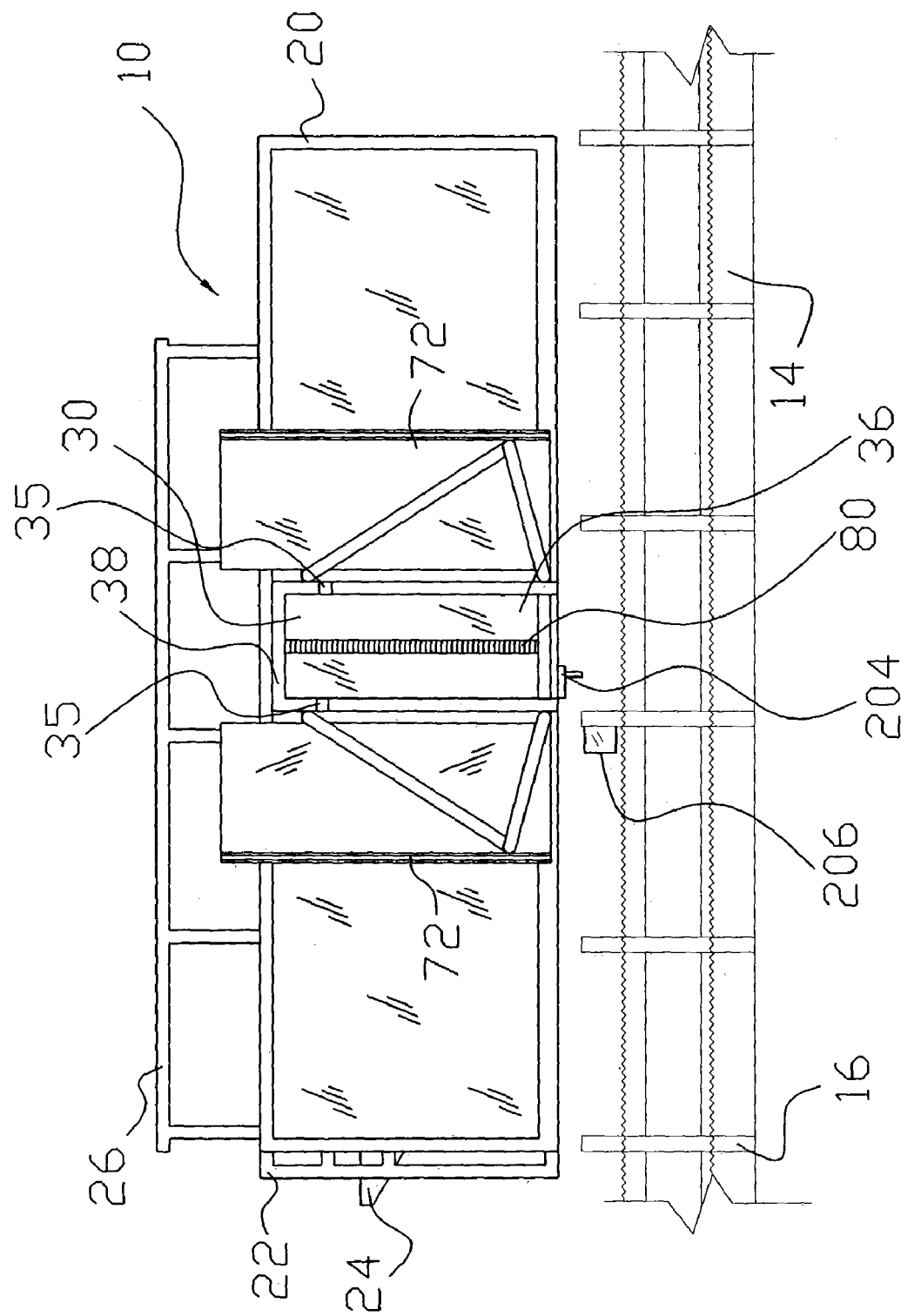
FIG. 5 is a left side view of the present invention.
Figure 6:
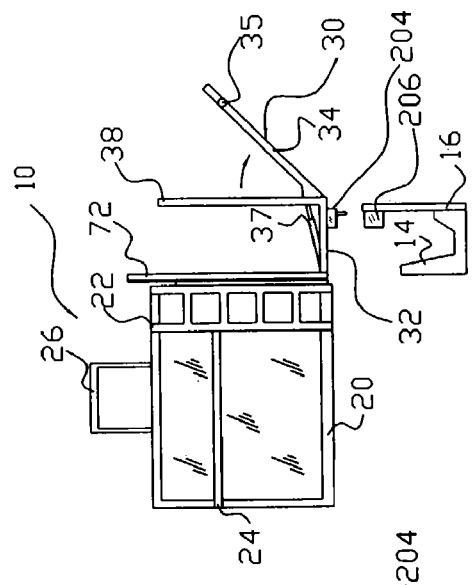
FIG. 6 is a rear view of the present invention.

As shown in FIG. 2 of the drawings, at least one side door 40 is positioned within the frame 20 for allowing the entry and exiting of animals from a heightened area such as a dock. The side door 40 may be opened and closed by a third cylinder 42 as shown in FIGS. 3 and 4 of the drawings. The third cylinder 42 is preferably comprised of a hydraulic cylinder, however various types of actuator devices may be utilized to manipulate the side door 40.

As shown in FIG. 1 of the drawings, at least one rear door 50 is positioned within the frame 20 for allowing the entry and exiting of animals from a heightened area such as a dock. The rear door 50 may be opened and closed by fourth cylinder 52 as shown in FIGS. 3 and 4 of the drawings. As, with the third cylinder 42, the fourth cylinder 52 is preferably comprised of a hydraulic cylinder, however various types of actuator devices may be utilized to manipulate the side door 40.

As further shown in FIGS. 3 and 4 of the drawings, a plurality of inner partitions 62 are positioned within the frame 20 for creating separate holding pens for the animals. In addition, a plurality of inner doors 60 are positioned within the interior portion of the frame 20 for allowing guiding, grouping, positioning, and separating of the animals within. The inner doors 60 are preferably manipulated by actuator devices such as hydraulic cylinders or the like. Various configurations may be utilized to construct the holding pens within the frame 20 of the animal transportation and tracking system 10 as can be appreciated by one skilled in the art. The inner doors 60 and the inner partitions 62 are arranged so that animals positioned within will stay separated and guided to the desired location.

As further shown in FIGS. 1 through 4 of the drawings, a catwalk 26 is preferably positioned upon the upper portion of the frame 20 to allow an individual to view the interior contents of the frame 20. A front platform 24 is also preferably attached to the side of the frame 20 as shown in FIGS. 2 through 4 of the drawings. A ladder 22 is attached to the side of the frame 20 adjacent the front platform 24 for allowing access to the front platform 24 and the catwalk 26 for an individual.

As shown in FIGS. 1 and 5 through 10 of the drawings, a ramp 30 is slidably positioned within an opening within the frame 20 preferably opposite of the side door 40. The ramp 30 is comprised of a first portion 32, a second portion 34 and a third portion 36 interconnected to one another. A support member 38 extends upwardly from the first portion 32 of the ramp 30 for providing support to the doors 70.

Figure 7:
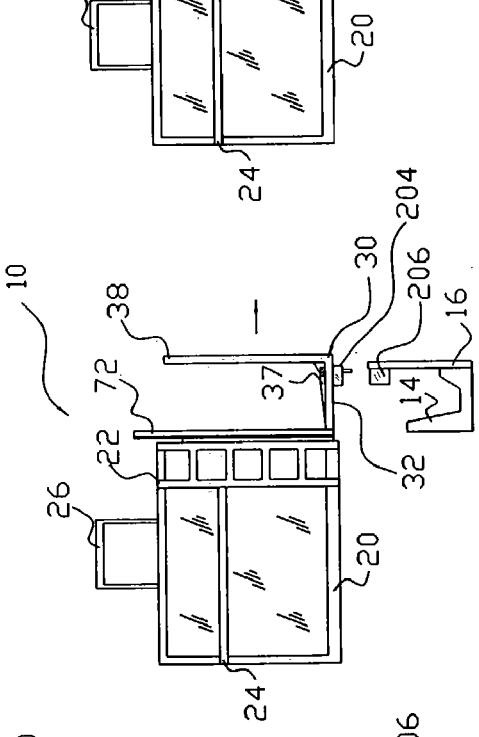
FIG. 7 is a rear view of the present invention with the first portion of the ramp extended.
Figure 8:
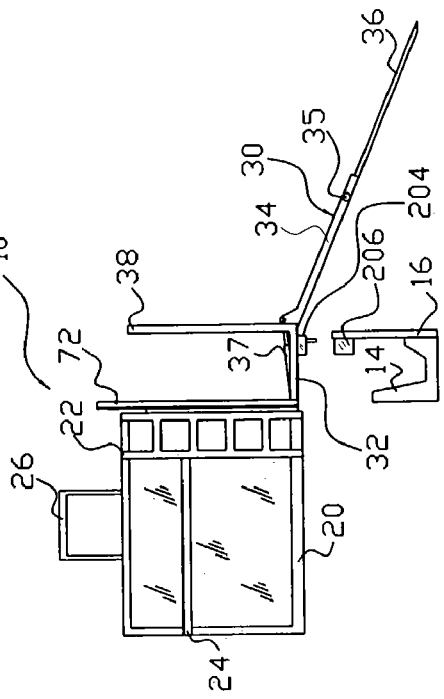
FIG. 8 is a rear view of the present invention with the second and third portion being pivoted outwardly with respect to the first portion.
Figure 9:
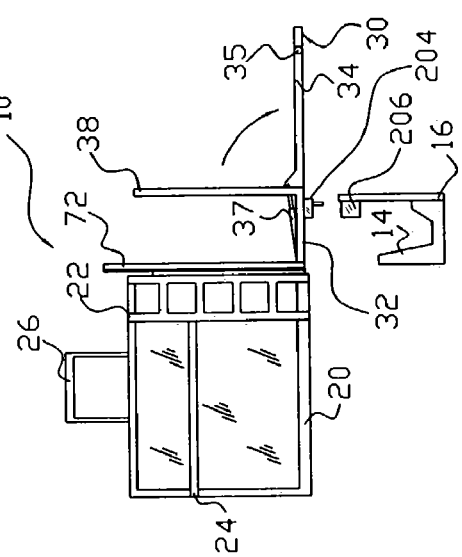
FIG. 9 is a rear view of the present invention with the second and third portion being pivoted outwardly with respect to the first portion in a substantially horizontal position.
Figure 10:
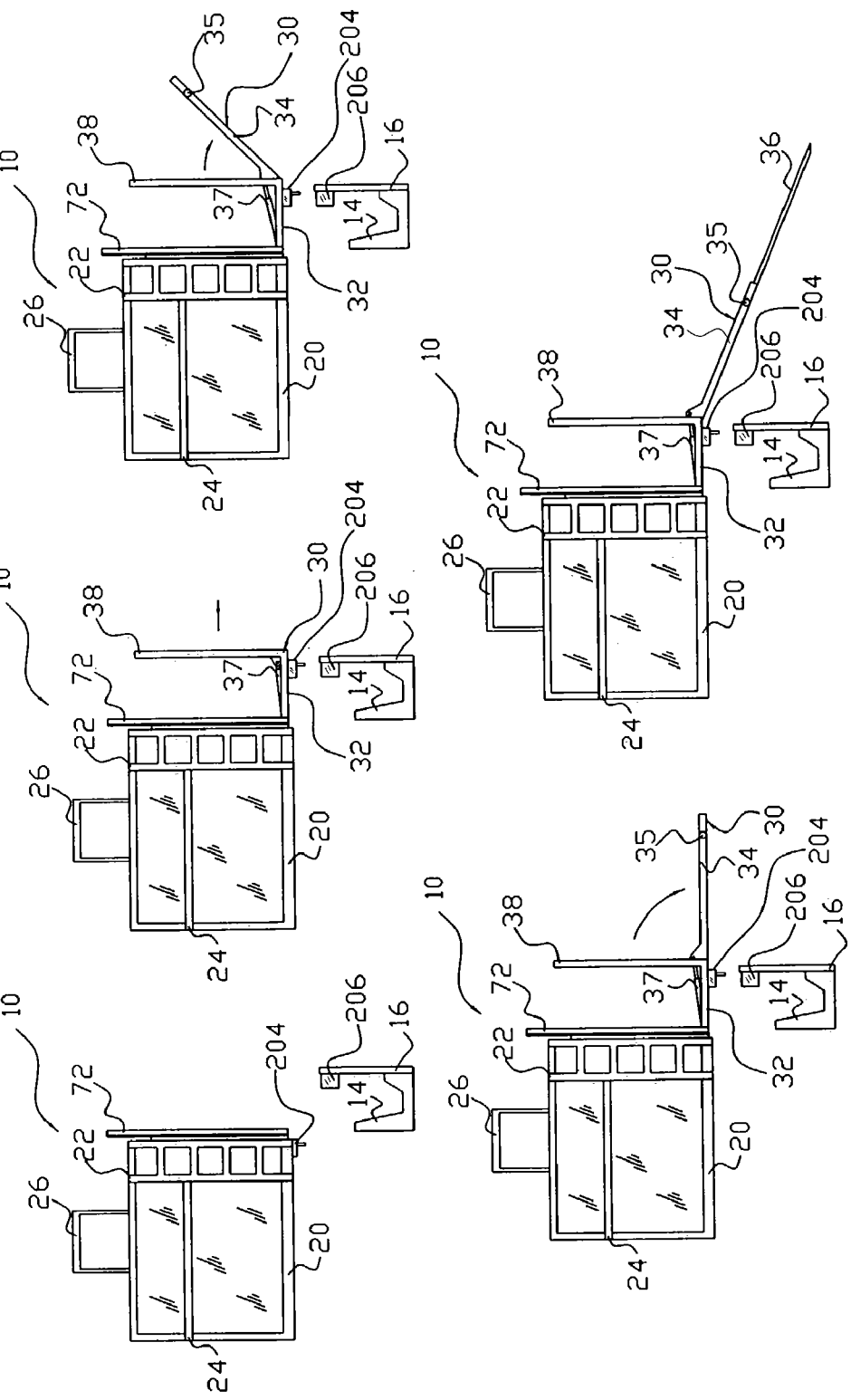
FIG. 10 is a rear view of the present invention with the ramp fully extended.

As shown in FIGS. 8 through 10 of the drawings, the first portion 32 of the ramp 30 is slidably positioned within the frame 20. The first portion 32 represents a horizontal deck when extended from the frame 20 as best shown in FIG. 10 of the drawings. The first portion 32 is slidably supported within the frame 20 by a slide rail system or similar structure commonly utilized. An actuator device such as a hydraulic cylinder extends and retracts the first portion 32 of the ramp 30 with respect to the frame 20 as shown in FIG. 7 of the drawings.

As shown in FIGS. 8 and 9 of the drawings, a second portion 34 of the ramp 30 is pivotally attached to the distal portion of the first portion 32 of the ramp 30. The second portion 34 is capable of being pivoted downwardly with respect to the first portion 32 and a ground surface as shown in FIGS. 9 and 10 of the drawings. One or more first cylinders 37 are mechanically attached between the first portion 32 and the second portion 34 for manipulating the second portion 34 with respect to the first portion 32 of the ramp 30 as shown in FIGS. 7 through 10 of the drawings.

Figure 11:
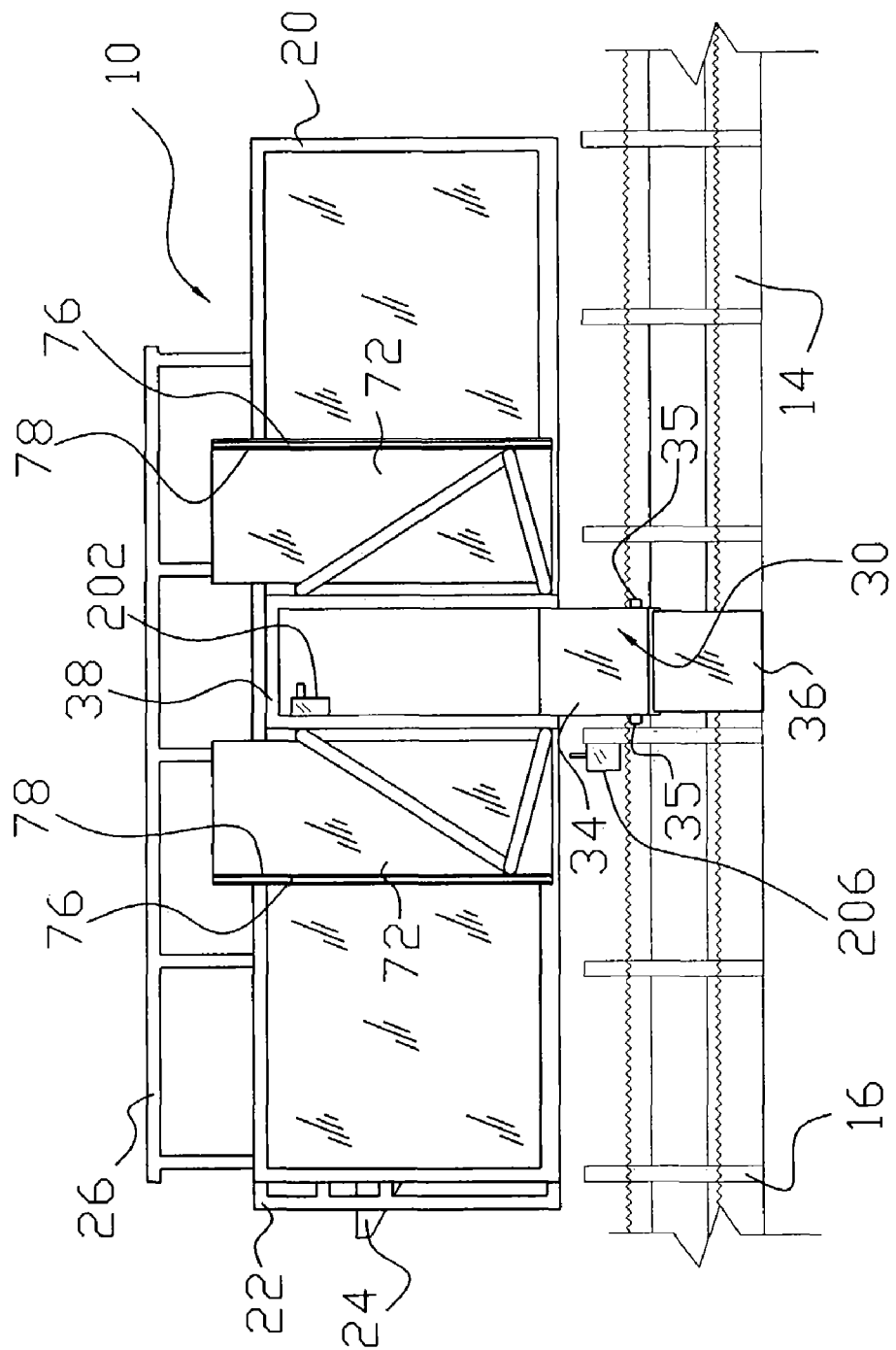
FIG. 11 is a left side view of the present invention with the ramp fully extended.

As further shown in FIGS. 10 and 11 of the drawings, the third portion 36 of the ramp 30 is slidably positioned within the second portion 34. As best shown in FIG. 10 of the drawings, the second portion 34 is extendable from the second portion 34 of the ramp 30 to engage a ground surface for loading and unloading animals into the animal transportation and tracking system 10. A compression spring 80 is preferably attached between the inner end of the third portion 36 and the distal end of the second portion 34 for assisting in extending the third portion 36 from within the second portion 34 when the second portion 34 is pivoted outwardly from the first cylinders 37.

Figure 12:
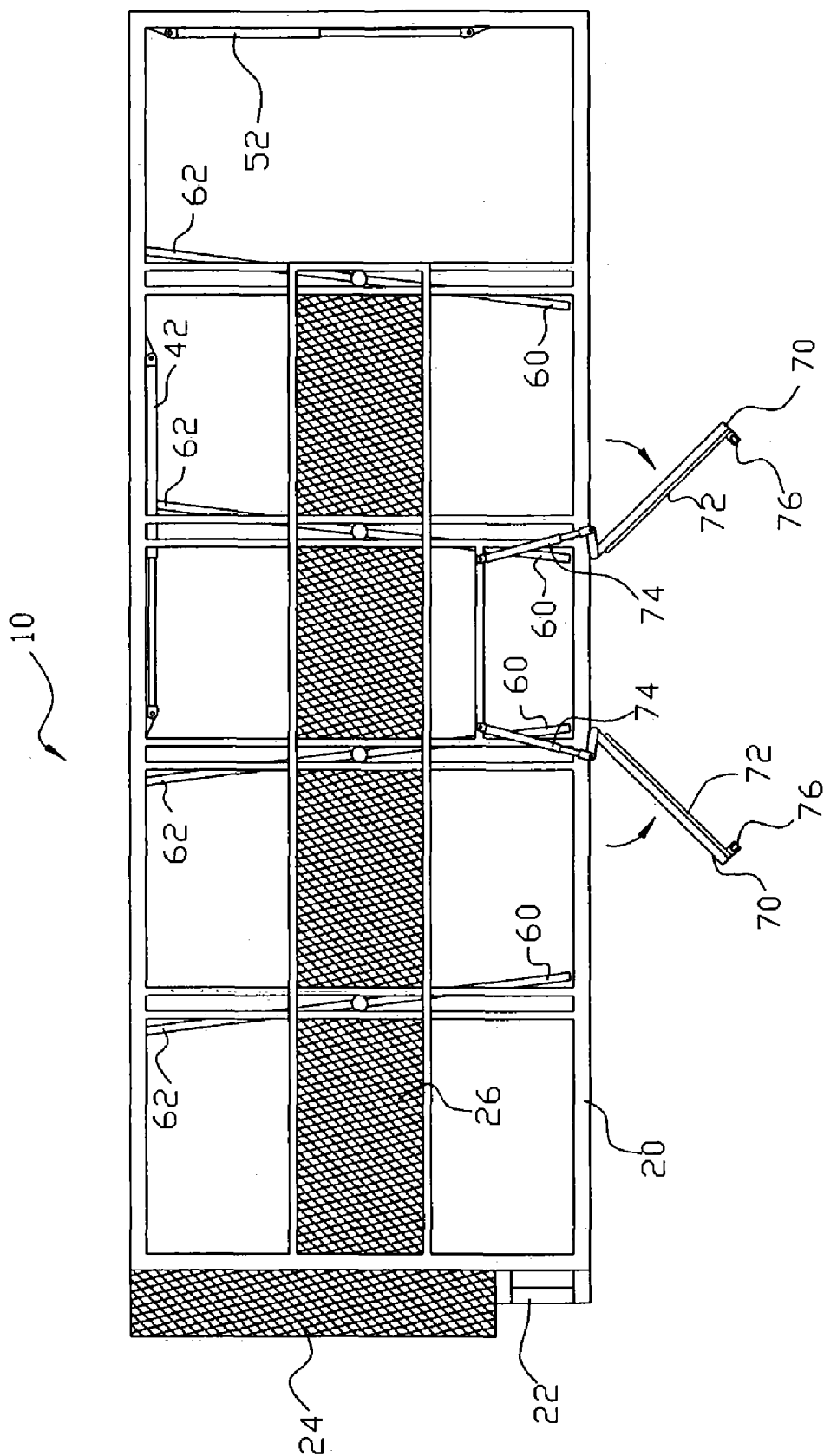
FIG. 12 is a top view of the present invention with the first doors and the second doors being pivoted inwardly.
Figure 13:
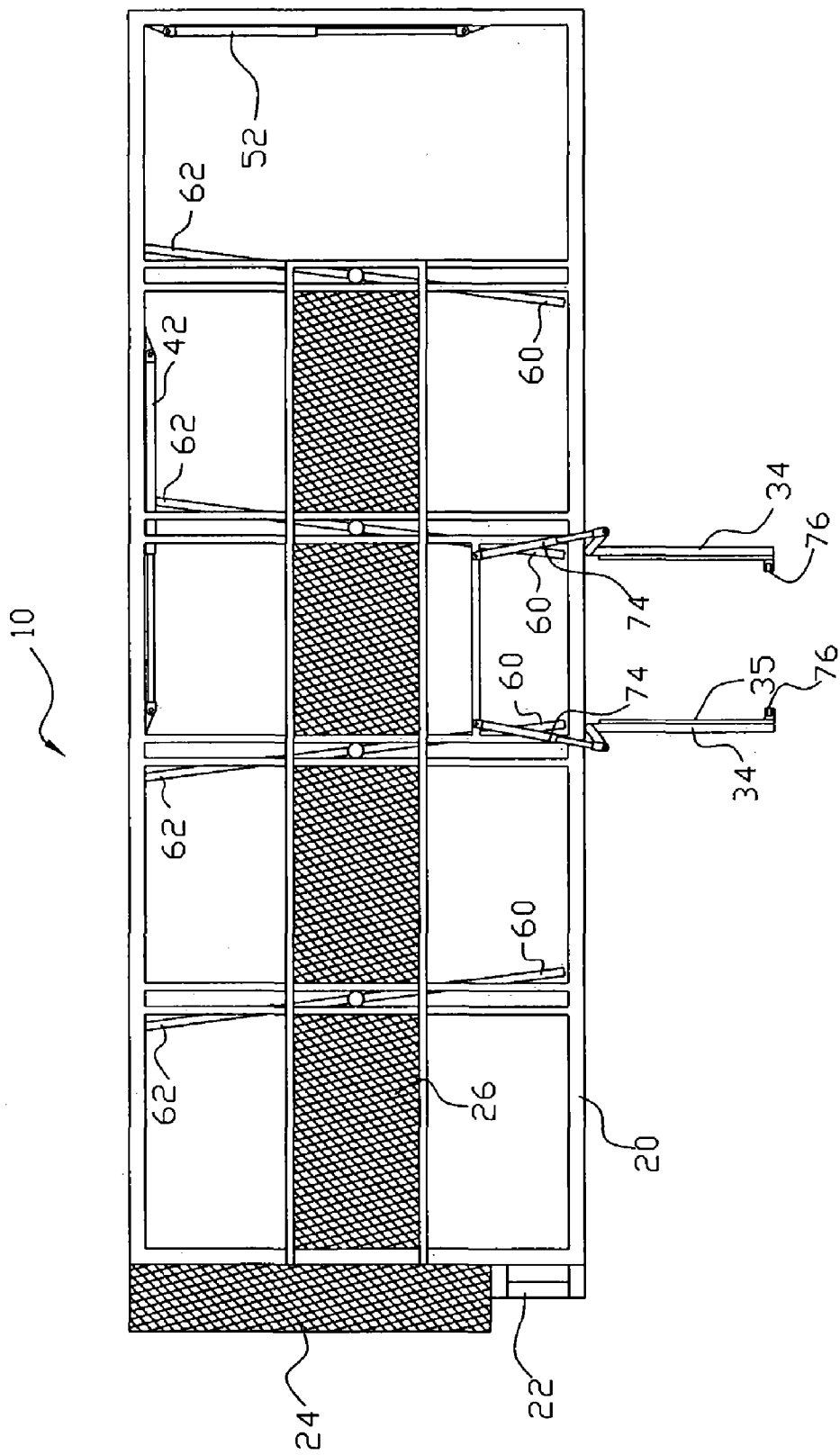
FIG. 13 is a top view with the first doors and the second doors extended orthogonally from the frame.

As shown in FIGS. 11 through 13 of the drawings, a pair of first doors 70 are pivotally attached to the frame 20 about the opening that receives the ramp 30. The first doors 70 have a horizontal plane of movement having a closed state adjacent the side walls of the frame 20 and an open state on opposing sides of the ramp 30. A pair of second cylinders 74 are connected between the frame 20 and the first doors 70 for pivoting the first doors 70 with respect to the frame 20 as best shown in FIGS. 12 and 13 of the drawings. The second cylinders 74 may be comprised of any well-known actuator device.

As best shown in FIGS. 15 through 17 of the drawings, a pair of second doors 72 are pivotally attached to the first doors 70. A pair of engaging rails 76 are attached to the outer portions of the second doors 72 that receive guide pins 35 attached to the distal portions of the second portion 34 of the ramp 30. A pair of slots 78 within the engaging rails 76 allow the guide pins 35 from the second portion 34 to extend into and out from the engaging rails 76 as shown in FIG. 11 of the drawings.

Figure 19:
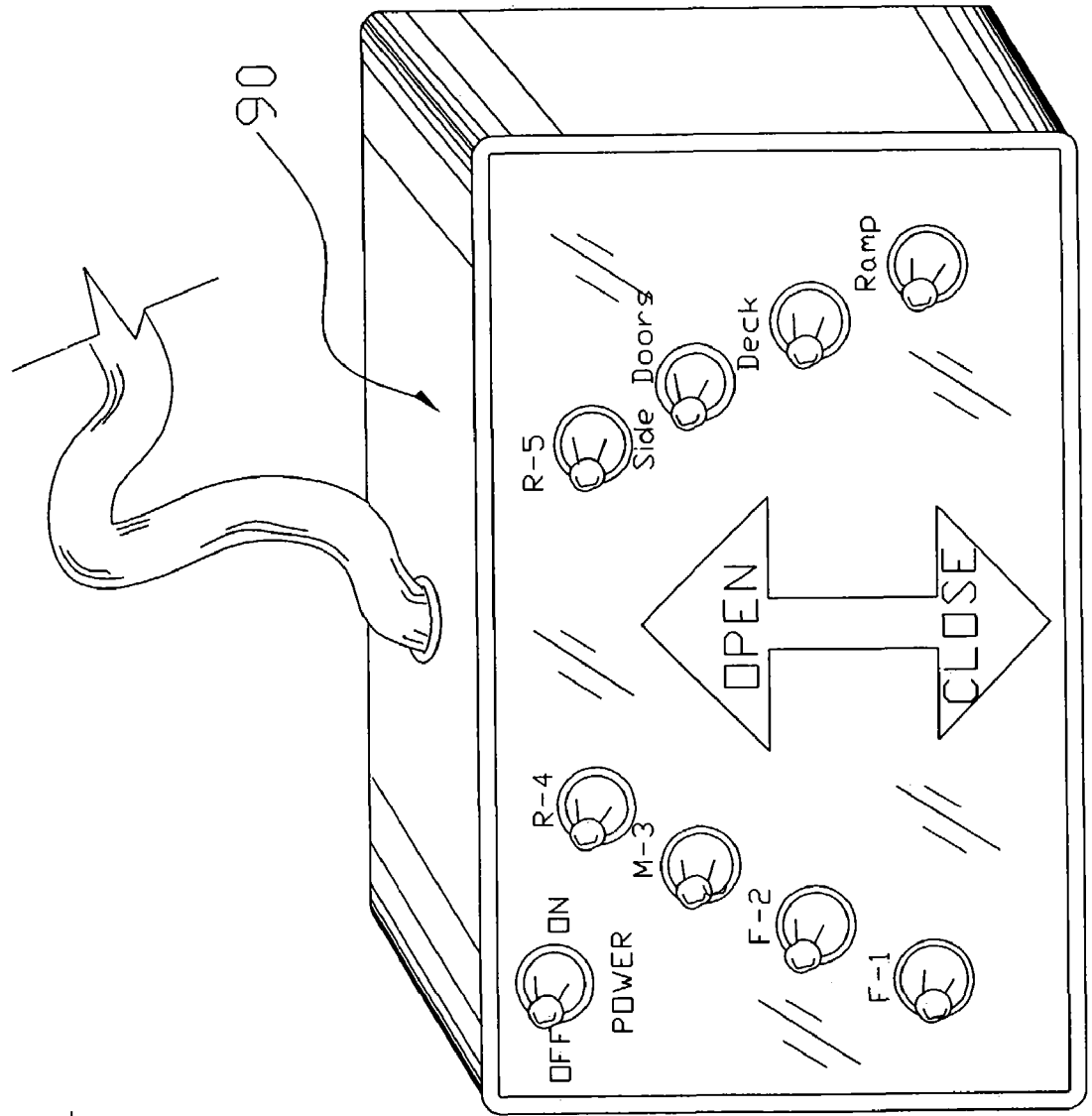
FIG. 19 is a top view of the control unit.

As shown in FIG. 19 of the drawings, at least one central control unit 90 is utilized to control the actuators and/or cylinders utilized upon the animal transportation and tracking system 10. The control unit 90 includes a plurality of switches commonly utilized to open and close hydraulic valves fluidly connected to the cylinders. Since control units 90 are commonly utilized no further explanation is required.

Figure 20:
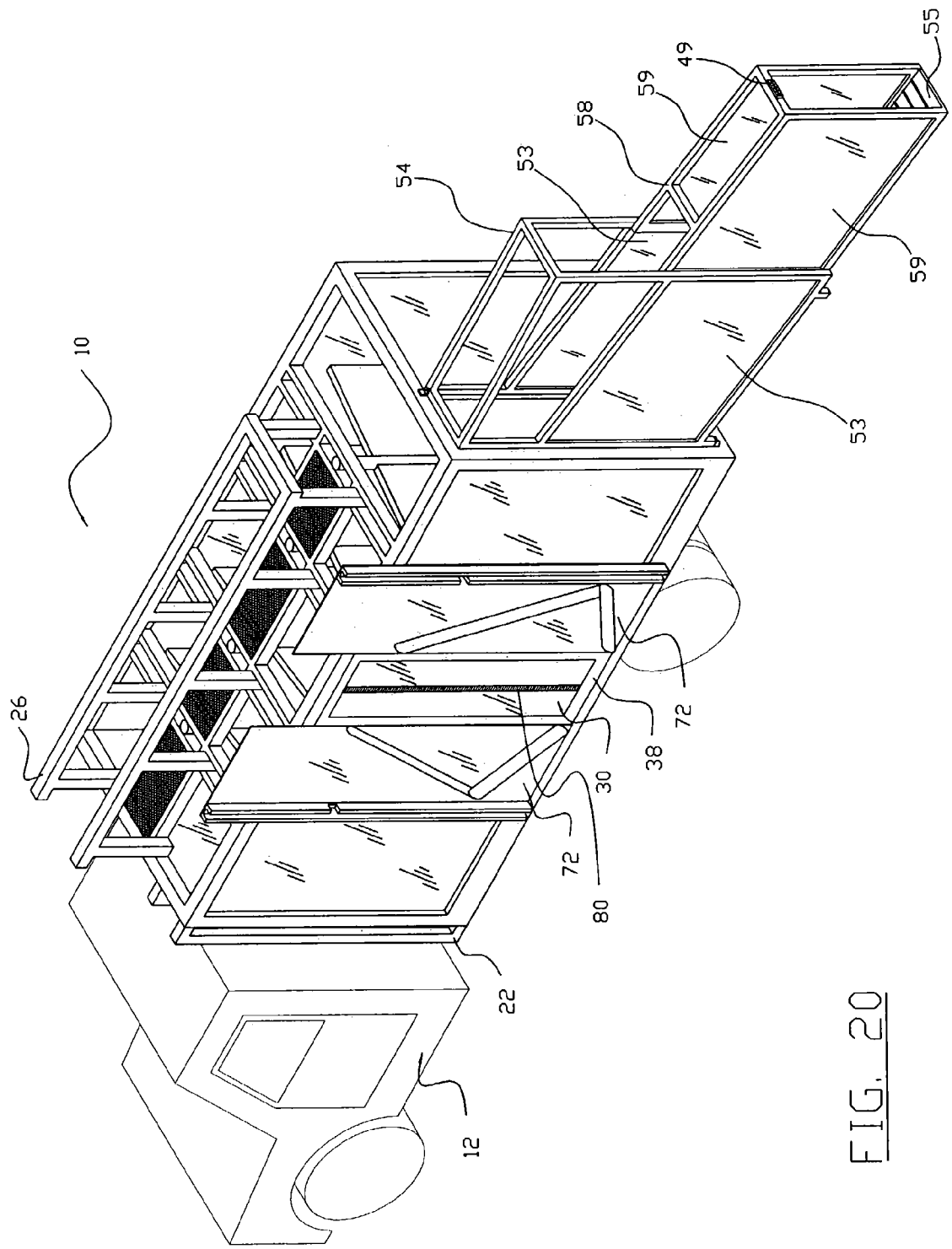
FIG. 20 is a left rear upper perspective view of an alternative embodiment illustrating a rear ramp structure fully extended for loading animals from ground level.
Figure 21:
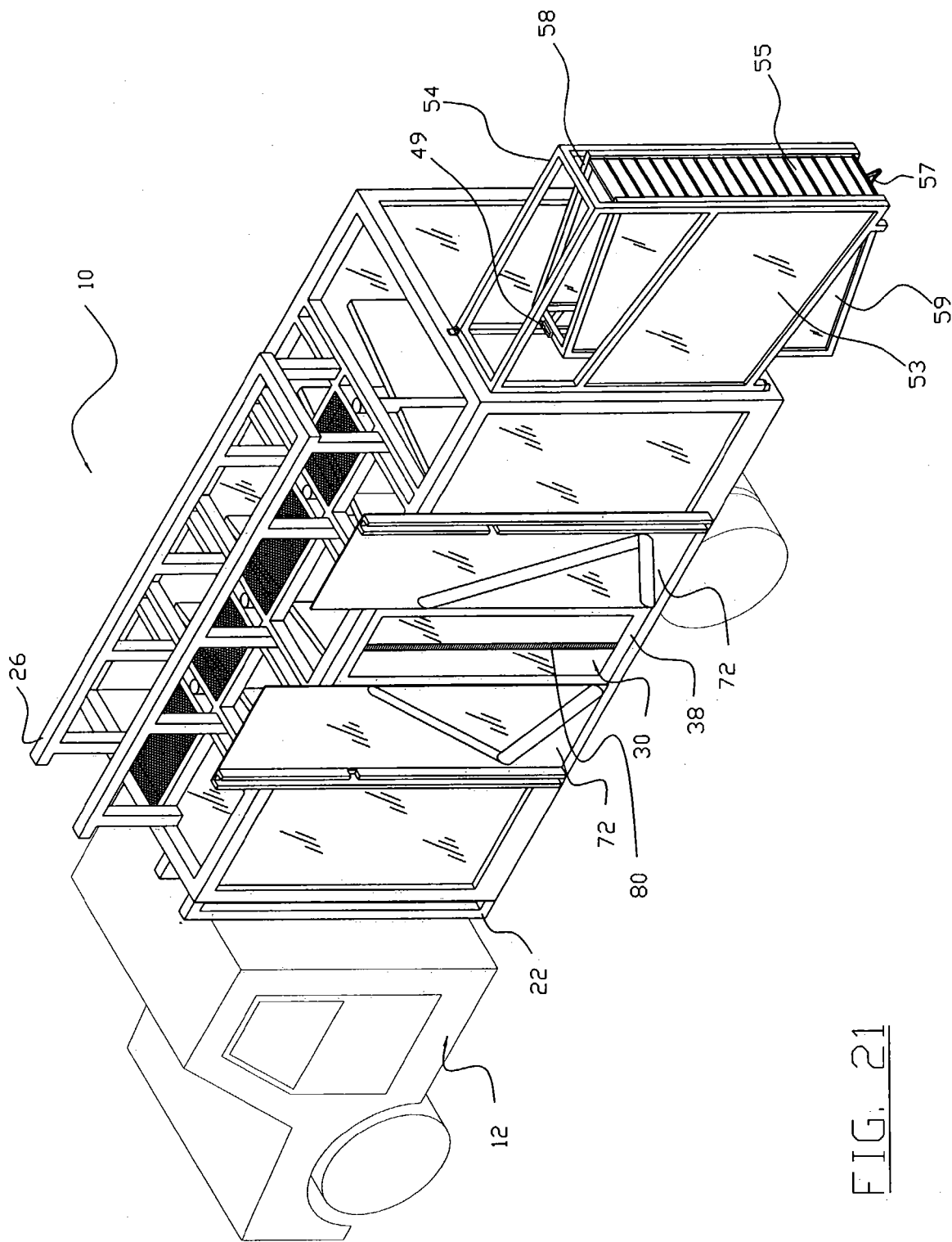
FIG. 21 is a left rear upper perspective view of an alternative embodiment illustrating a rear ramp structure partially folded.
Figure 22:
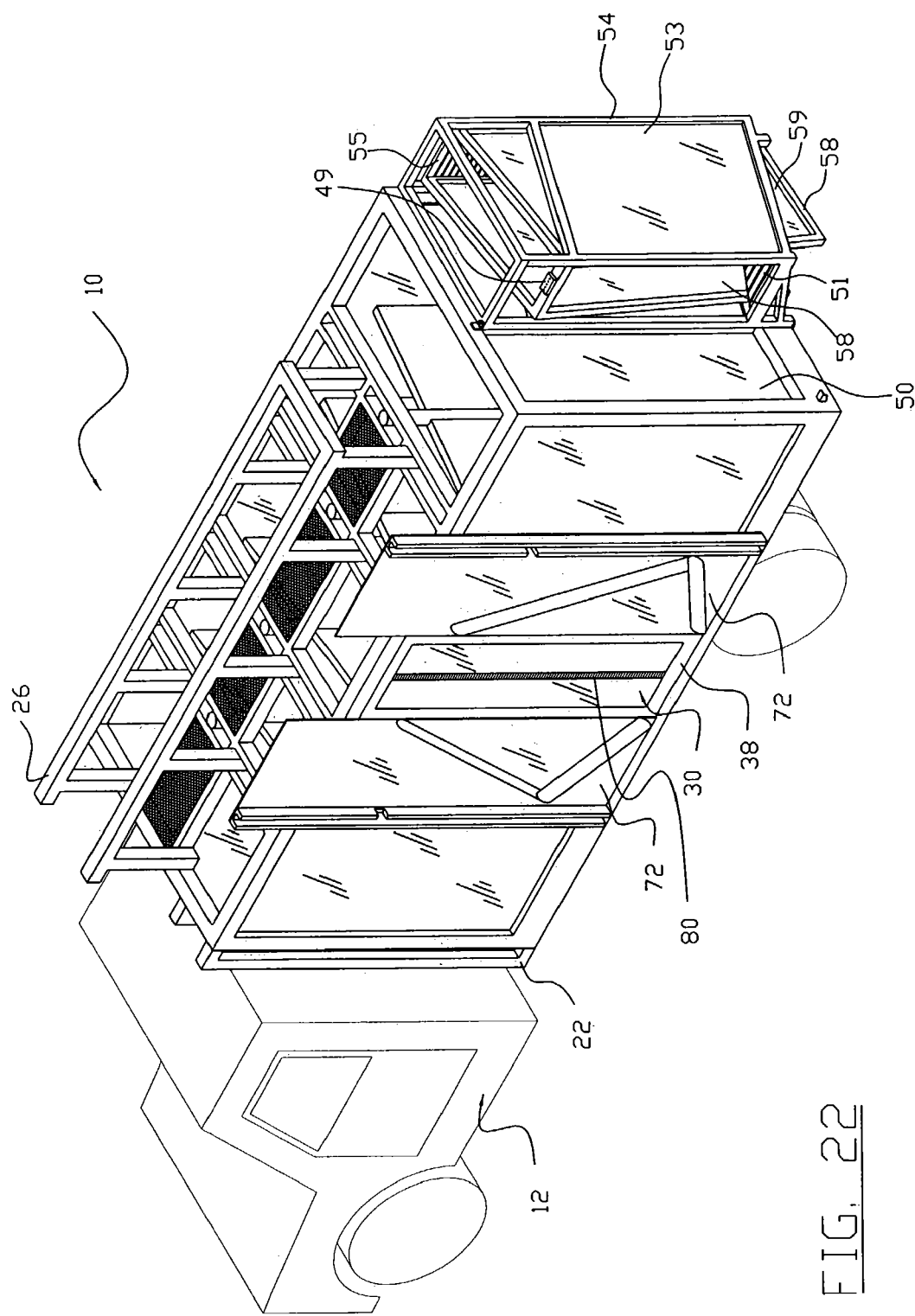
FIG. 22 is a left rear upper perspective view of an alternative embodiment illustrating a rear ramp structure completed folded and positioned within a storage position with respect to the frame.
Figure 23:
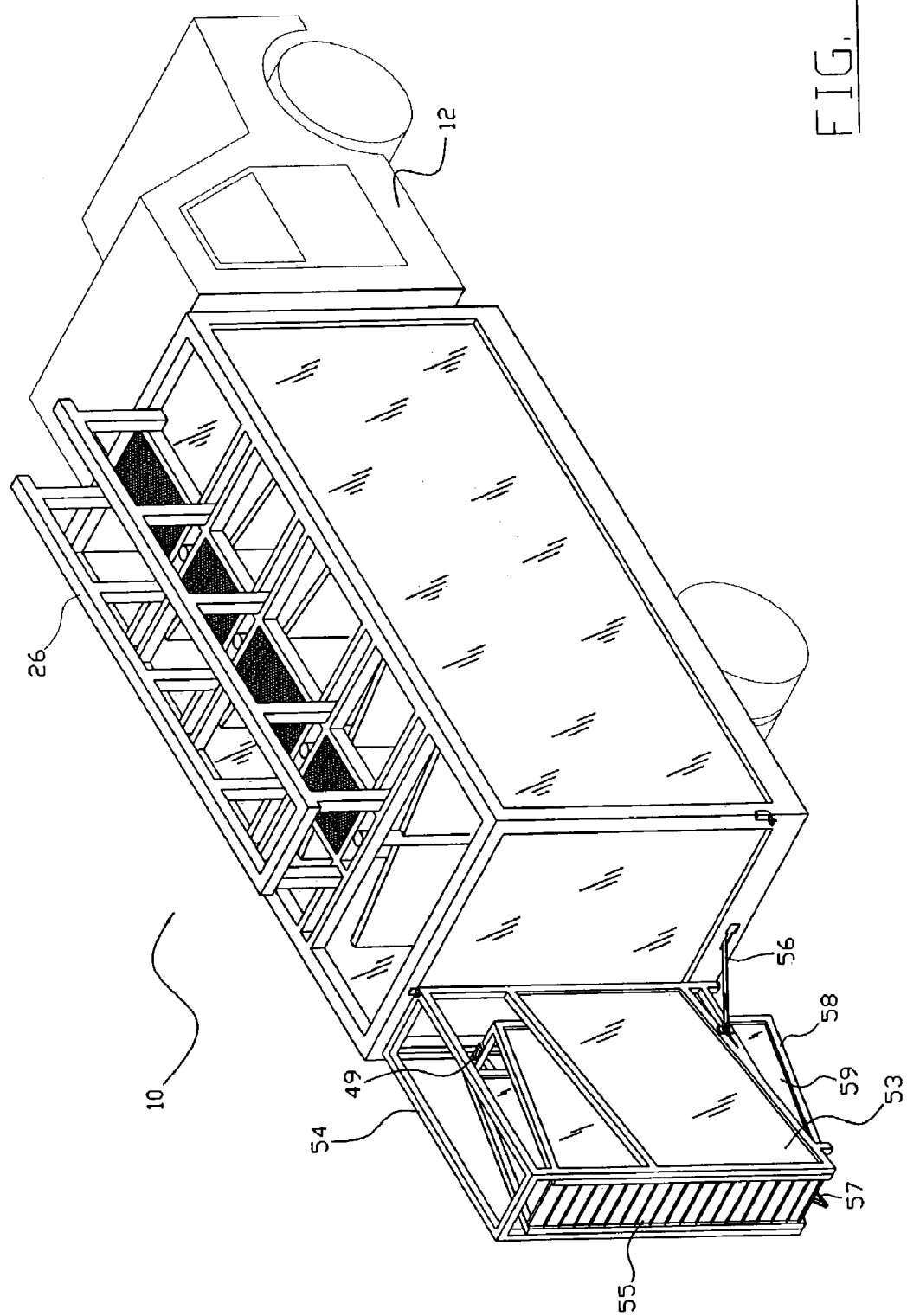
FIG. 23 is a right rear upper perspective view of an alternative embodiment illustrating a rear ramp structure partially folded.
Figure 24:
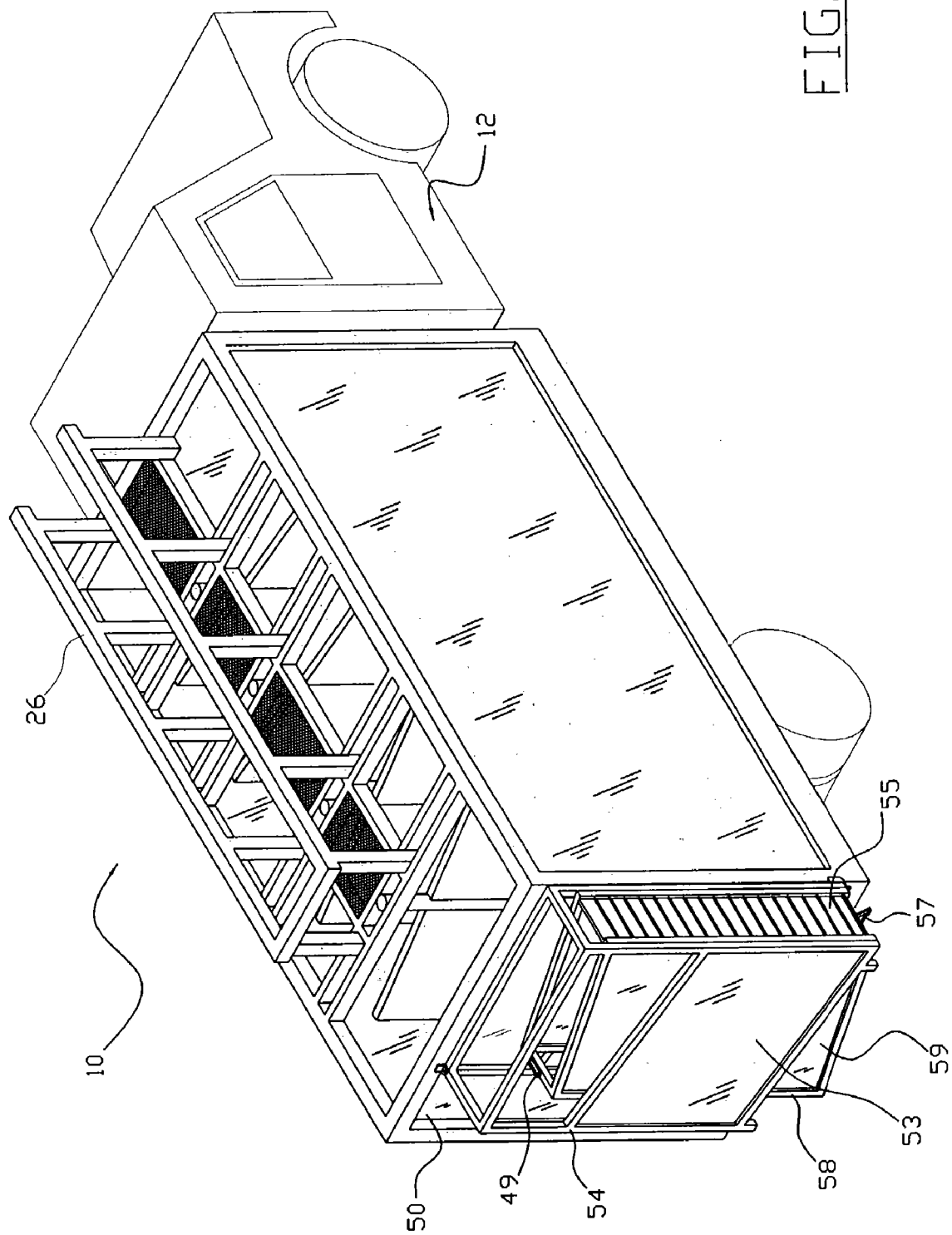
FIG. 24 is a right rear upper perspective view of an alternative embodiment illustrating a rear ramp structure completed folded and positioned within a storage position with respect to the frame.

FIGS. 20 through 27 illustrate the usage of a rear ramp structure attached to the rear of the frame 20 adjacent to the rear door 50. The rear ramp structure is comprised of a rear frame 54 pivotally attached to the frame 20 pivoting along a horizontal plane. As best illustrated in FIG. 22, only one side of the rear frame 54 is pivotally attached to the frame 20. A rear frame cylinder 56 is attached between the frame 20 and the rear frame 54 for extending and contracting the rear frame 54 with respect to the rear portion of the frame 20. The rear frame 54 has a rear floor and a pair of opposing rear sidewalls 53 that guide the animals from and to the year door 50 as best illustrated in FIGS. 20 and 21 of the drawings.

Figure 25:
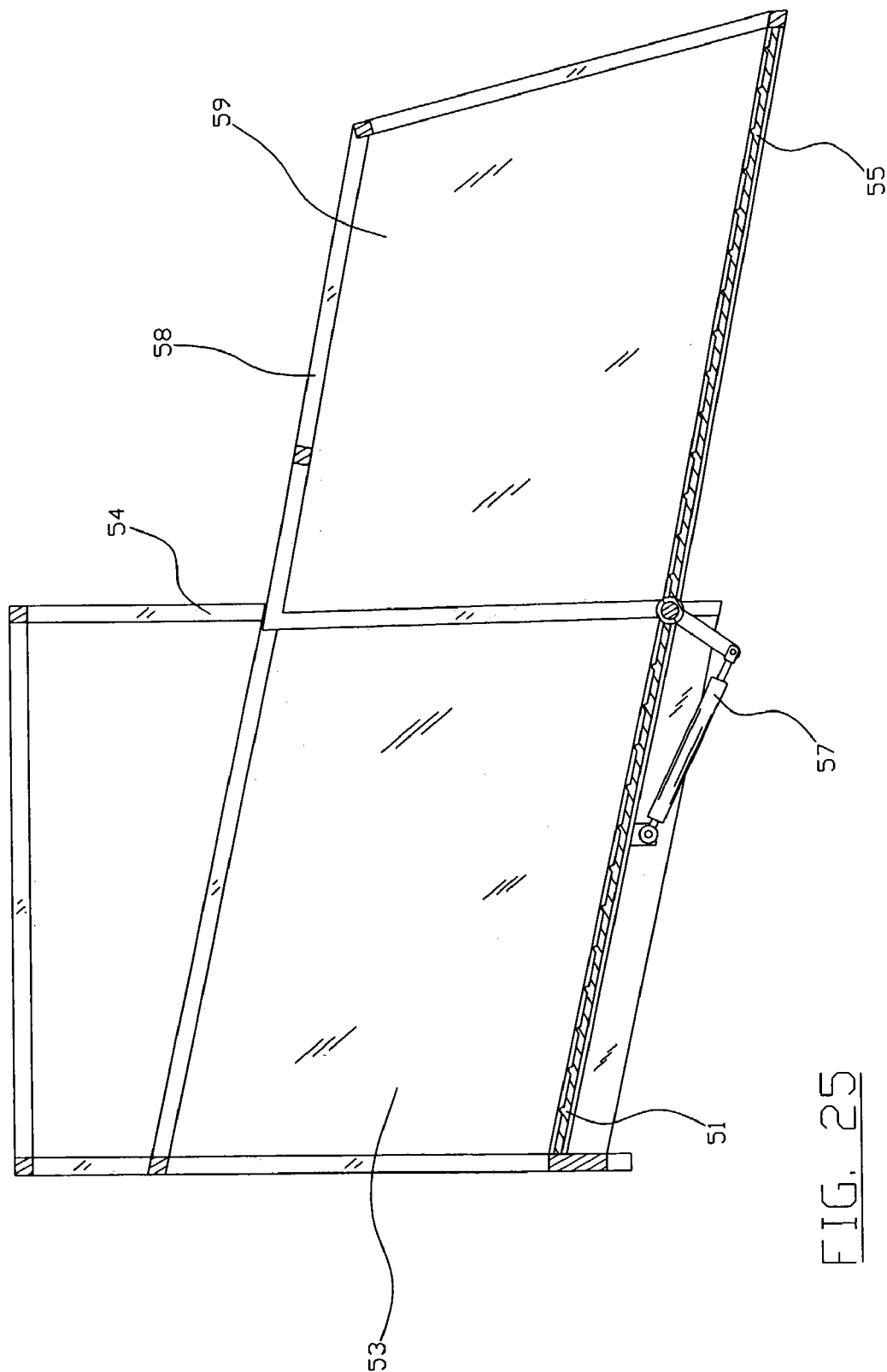
FIG. 25 is a side cutaway view of the alternative embodiment illustrating the rear ramp structure fully extended for loading animals from ground level.
Figure 26:
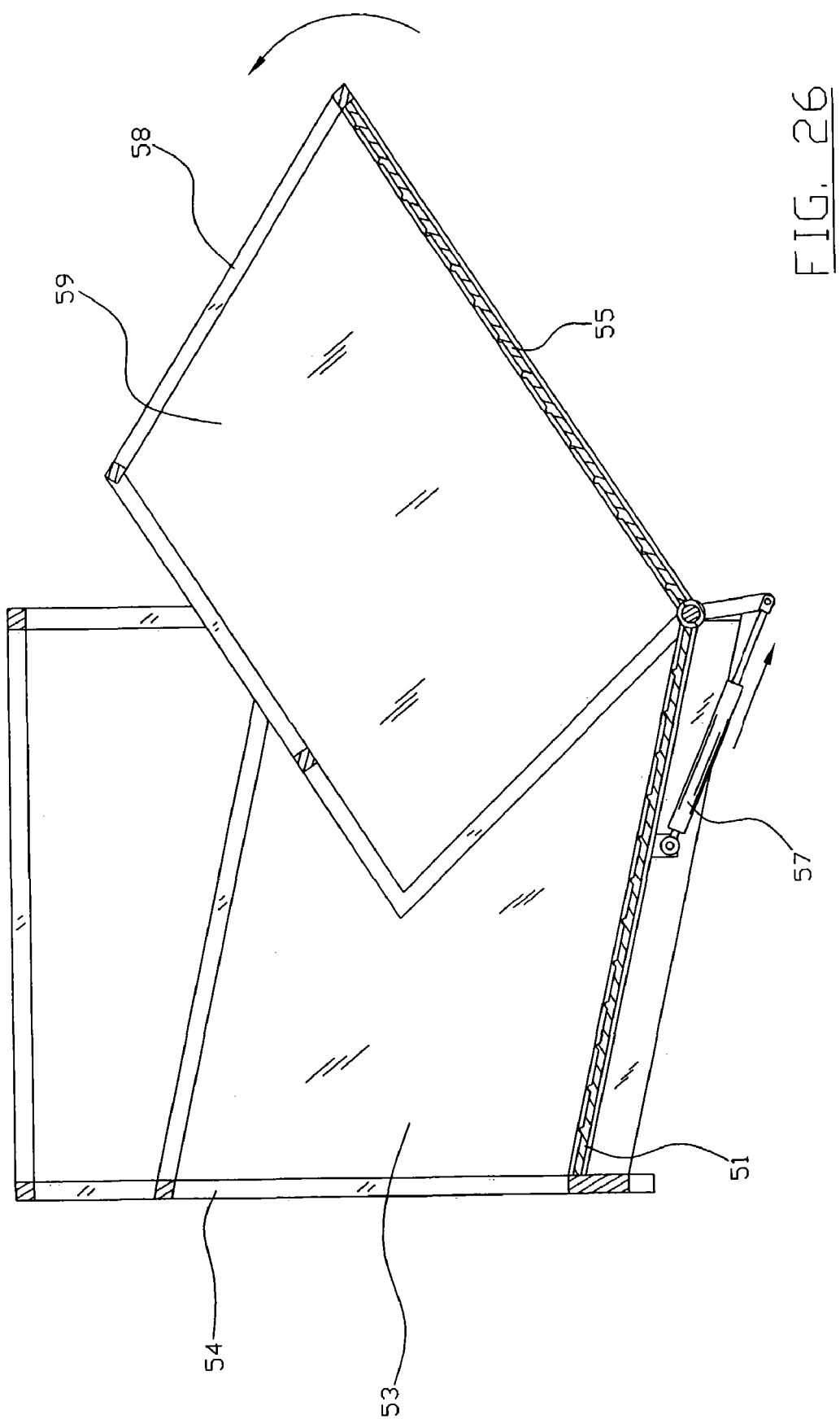
FIG. 26 is a side cutaway view of the alternative embodiment illustrating the rear ramp partially folded within the rear frame of the rear ramp structure.
Figure 27:
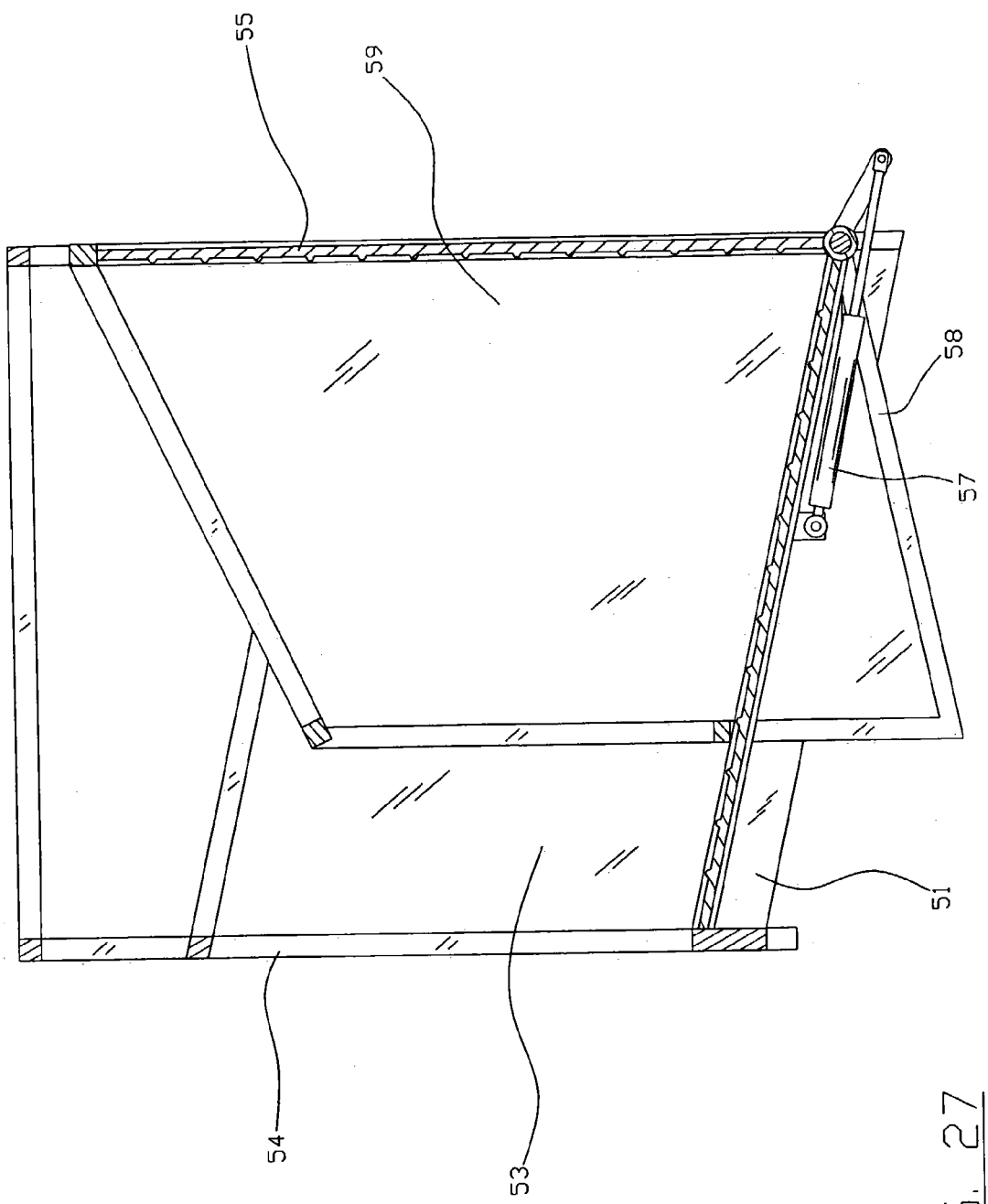
FIG. 27 is a side cutaway view of the alternative embodiment illustrating the rear ramp completely folded within the rear frame of the rear ramp structure.

As shown in FIGS. 25 through 27 of the drawings, the rear floor 51 preferably is declined from the frame 20 in a rearward manner. The rear floor 51 preferably includes a gripping material or structure for assisting animals during their travel upon the rear floor.

As shown in FIGS. 20 through 27 of the drawings, a rear ramp frame 58 is pivotally attached to a distal end of the rear frame 54 and is pivotal along a vertical plane. A rear ramp 55 and a pair of opposing rear ramp sidewalls 59 are attached to the rear ramp frame 58 for guiding the animals. A rear floor cylinder 57 is connected between the rear frame 54 and the rear ramp frame 58 for pivoting the rear ramp frame 58 with respect to the rear frame 54 as best illustrated in FIG. 26 of the drawings.

As shown in FIG. 20 of the drawings, a rear control unit 49 is positioned upon the rear ramp frame 58 which, allows for the controlling of the rear ramp structure. Using the rear control unit 49 or the main control unit 90, the user is able to control the pressurized fluid to the rear frame cylinder 56 and the rear floor cylinder 57. When the operator desires to load or unload animals through the rear door 50 onto a ground level surface, the operator manipulates the rear control unit 49 such that the rear frame cylinder 56 forces the rear frame 54 outwardly so as to extend substantially rearwardly and substantially surrounding the rear door 50 as shown in FIG. 21 of the drawings. The user then manipulates the rear control unit 49 to cause the rear floor cylinder 57 to pivot the rear ramp frame 58 outwardly from the rear frame 54 as shown in FIGS. 20 and 25 of the drawings. As best illustrated in FIG. 25 of the drawings, the rear floor 51 and the rear ramp 55 preferably form a substantially continuous surface for the animals to walk upon.

Figure 28:
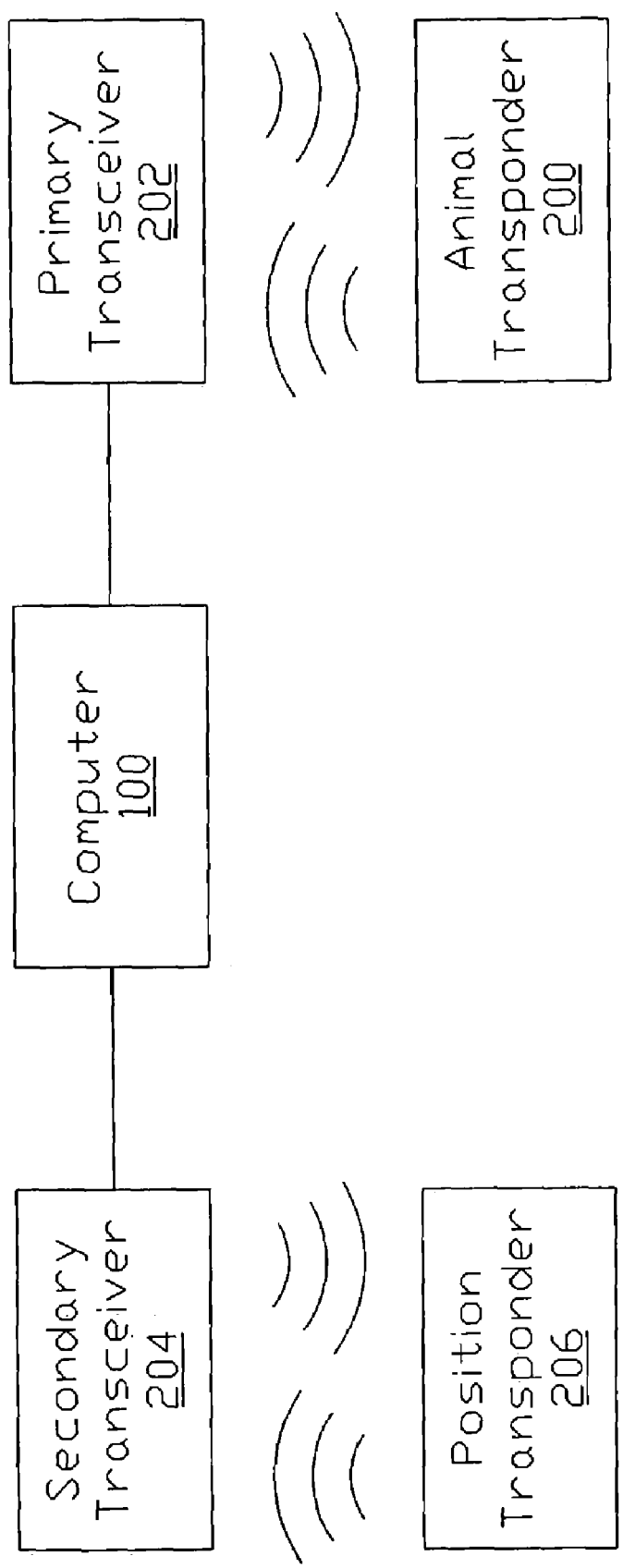
FIG. 28 is a block diagram of the animal tracking system.
Figure 29:
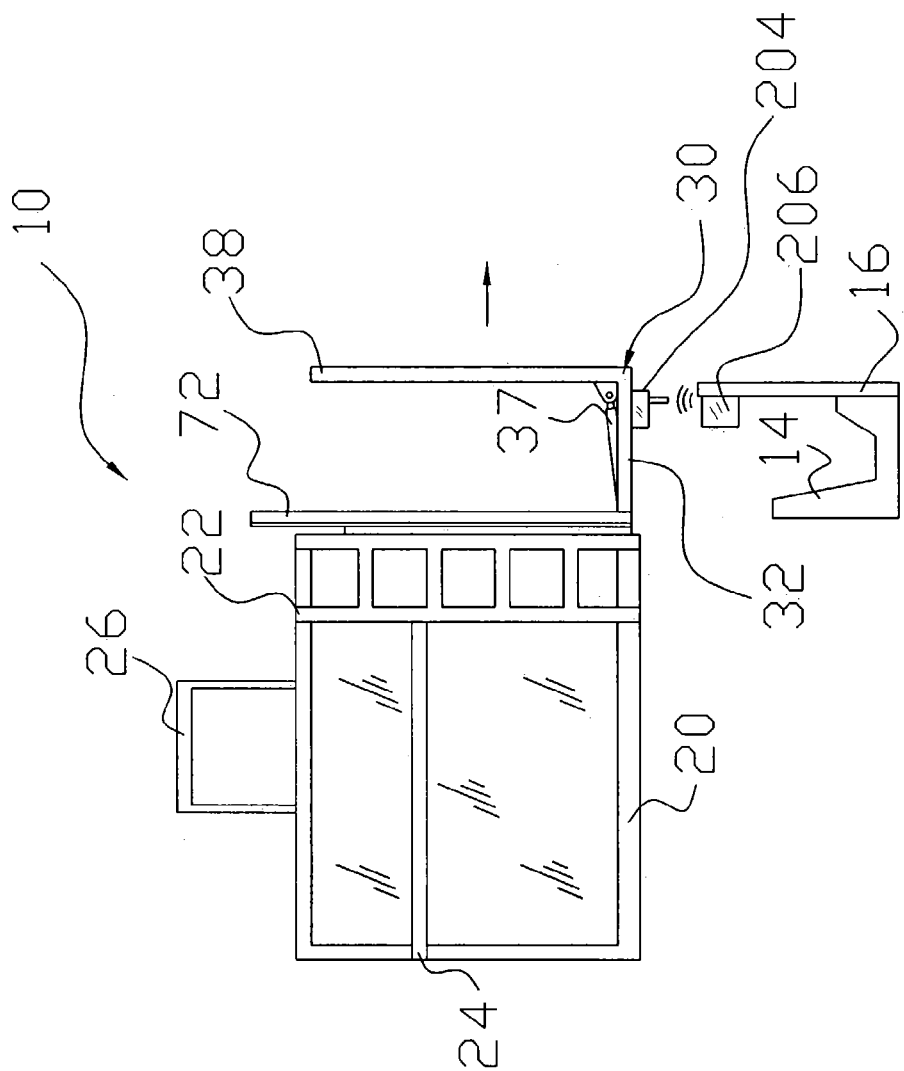
FIG. 29 is a rear view of the present invention illustrating the communication of the secondary transceiver with the load location/unload location.
Figure 30:
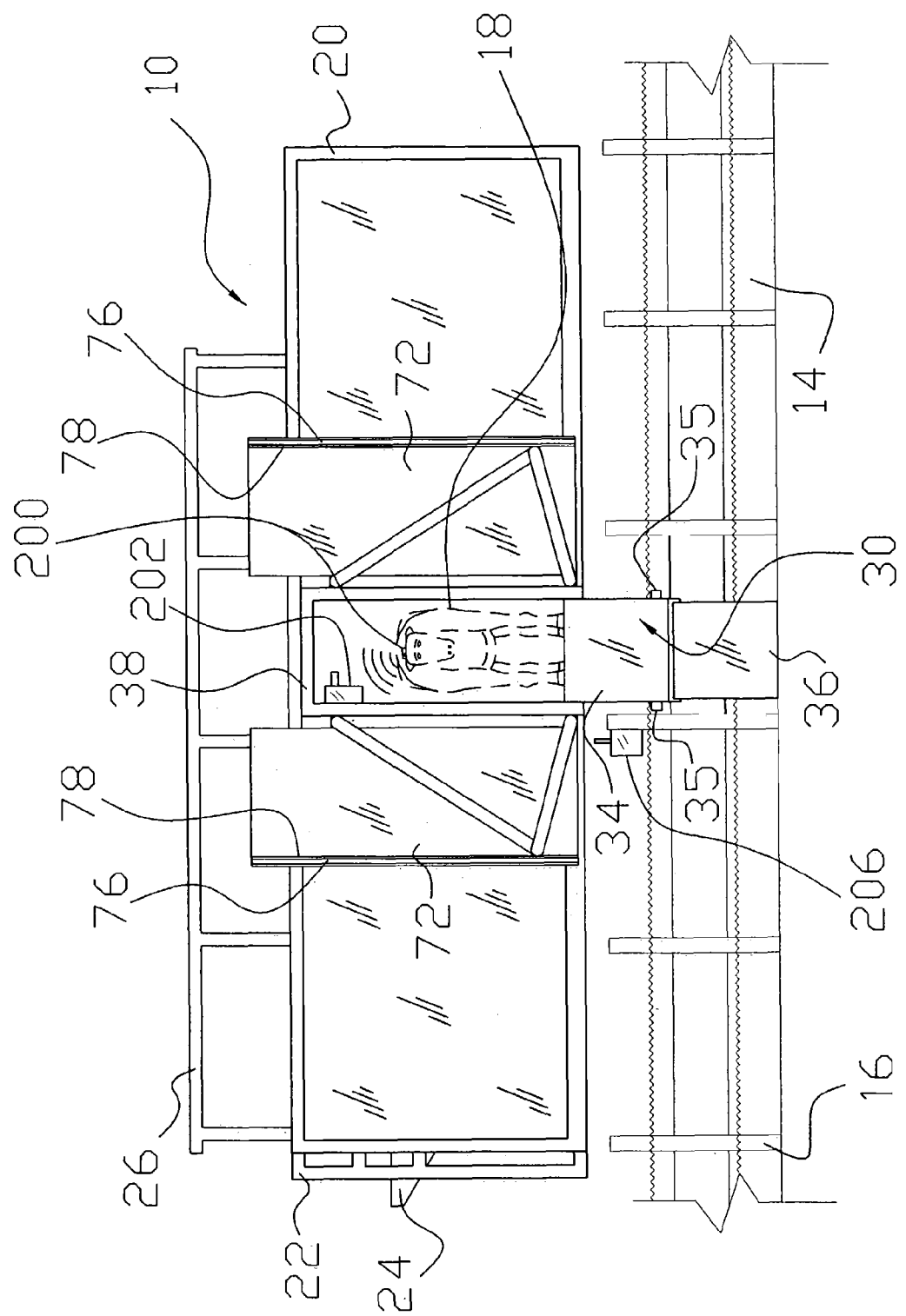
FIG. 30 is a side view of the present invention illustrating the communication of the animal transponder with the primary transceiver.

As shown in FIG. 28 of the drawings a computer 100, a primary transceiver 202 in communication with the computer 100, an animal transponder 200 in communication with the primary transceiver 202, a secondary transceiver 204 in communication with the computer 100, and a position localizer 206 in communication with the secondary transceiver 204. The communication technology utilized within the present invention is known in the livestock industry, such as EZ-ID products manufactured by EZID, LLC (www.ezi-david.com), which are hereby incorporated by reference.

Figure 31:
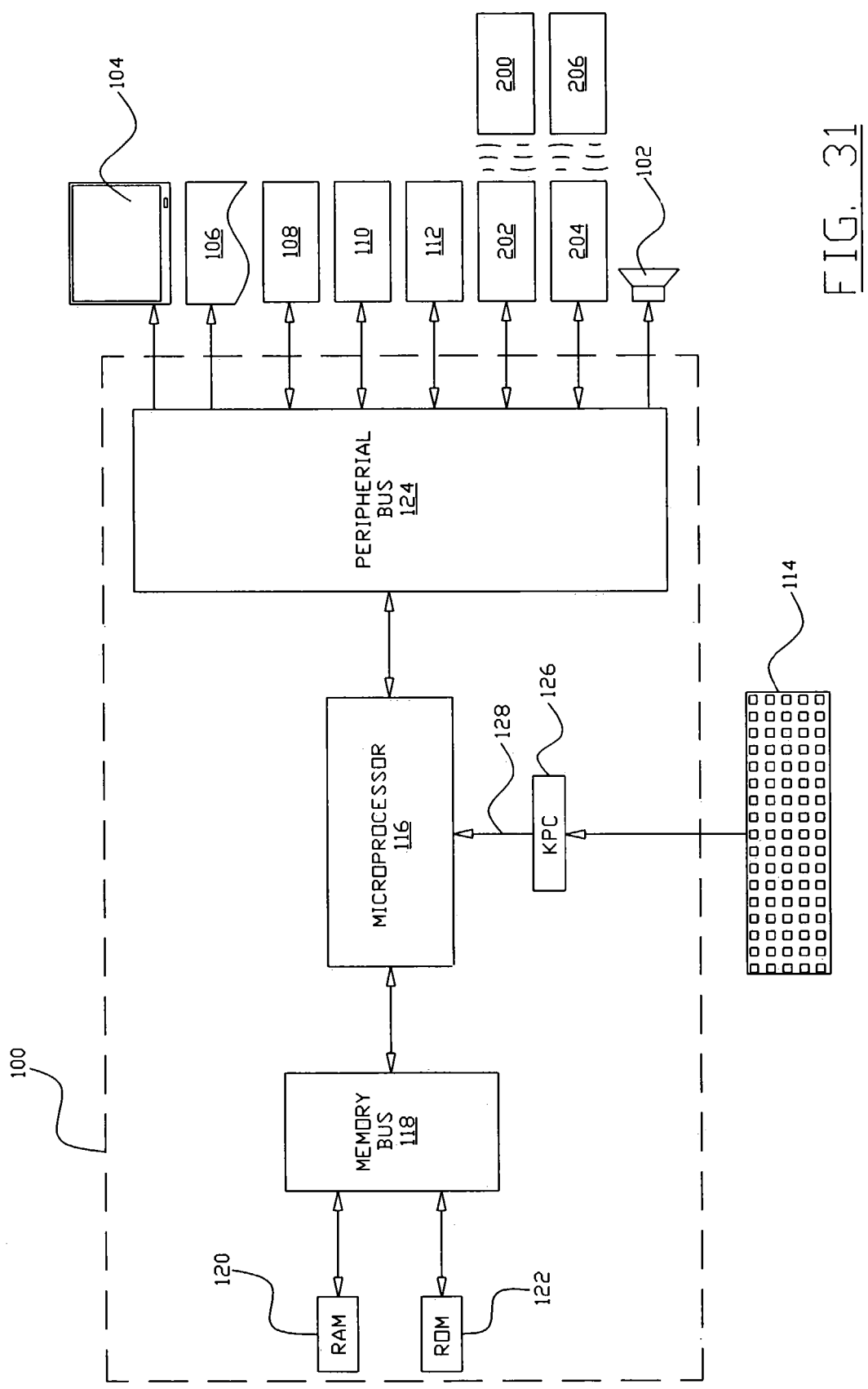
FIG. 31 is a block diagram of an exemplary computer for use within the present invention.

FIG. 31 is a block diagram of an exemplary computer system 100 for practicing the various aspects of the present invention. The computer 100 is capable of receiving an entry location, an exit location, animal identification data and various other types of data/information relevant to livestock. The computer 100 is also preferably capable of generating various reports including but not limited to animal entry and animal exit information.

The computer system 100 includes a display screen (or monitor) 104, a printer 106, a floppy disk drive 108, a hard disk drive 110, a network interface 112, and a keyboard 114. The computer system 100 also includes a microprocessor, 116, a memory bus 118, random access memory (RAM) 120, read only memory (ROM) 122, a peripheral bus 124, and a keyboard controller 126. Computer system 100 can be a personal computer (such as an APPLE computer, an IBM computer, or one of the compatibles thereof), a workstation computer (such as a SUN MICROSYSTEMS or HEWLETT-PACKARD workstation), or various other types of computers. It can be appreciated that the computer system 100 may be comprised of various other electronic devices including but not limited to mobile phones, telephones, personal digital assistants (PDAs), and handheld wireless devices.

The microprocessor 116 is a general-purpose digital processor that controls the operation of the computer system 100. Microprocessor 116 can be a single-chip processor or implemented with multiple components. Using instructions retrieved from memory, microprocessor 116 controls the reception and manipulations of input data and the output and display of data on output devices.

The memory bus 118 is utilized by the microprocessor 116 to access the RAM 120 and the ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to, access the input, output and storage devices used by the computer system 100 In the described embodiment(s), these devices include a display screen 104, a printer device 106, a floppy disk drive 108, a hard disk drive 110, and a network interface 112. A keyboard controller 126 is used to receive input from the keyboard 114 and send decoded symbols for each pressed key to microprocessor 116 over bus 128.

The display screen 104 is an output device that displays images of data provided by the microprocessor 116 via the peripheral bus 124 or provided by other components in the computer system 100. The printer device 106 when operating as a printer provides an image on a sheet of paper or a similar surface. Other output devices such as a plotter, typesetter, etc. can be utilized in place of, or in addition to, the printer device 106.

The floppy disk drive 108 and the hard disk drive 110 can be utilized to store various types of data. The floppy disk drive 108 facilitates transporting such data to other computer systems, and the hard disk drive 110 permits fast access to large amounts of stored data.

The microprocessor 116 together with an operating system operate to execute computer code and produce and use data. The computer code and data may reside on RAM 120, ROM 122, or hard disk drive 110. The computer code and data can also reside on a removable program medium and loaded or installed onto computer system 100 when needed. Removable program mediums include, for example, CD-ROM, PC-CARD, floppy disk and magnetic tape.

The network interface circuit 112 is utilized to send and receive data over a network connected to other computer systems. An interface card or similar device and appropriate software implemented by microprocessor 116 can be utilized to connect the computer system 100 to an existing network and, transfer data according to standard protocols.

The keyboard 114 is used by a user to input commands and other instructions to the computer system 100. Other types of user input devices can also be used in conjunction with the present invention. For example, pointing devices such as a computer mouse, a track ball, a stylus, or a tablet to manipulate a pointer on a screen of the computer system 100.

The present invention can also be embodied as computer readable code on a computer readable medium. The computer readable medium is any data storage device that can store data which can be thereafter be read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

The present invention may be embodied within various languages and technologies such as but not limited to JAVA, JAVASCRIPT, JSCRIPT, WMLSCRIPT, ACTIVEX, CGI, scripts, plug-ins, BASIC, VISUAL BASIC, C, C++, COBOL, FORTRAN, ADA, HTML, DHTML, XML, SGML, WML, HDML, FLASH, SHOCKWAVE, GIF, JPEG, ADOBE ACROBAT, PDF, MICROSOFT WORD, and PASCAL. The present invention may be operated upon various operating systems such as but not limited to UNIX, MACINTOSH, LINUX, WINDOWS, PALMOS, EPOC, WINDOWS CE, FLEXOS, OS/9, and JAVAOS.

The primary transceiver 202 is in communication with the computer 100 via various communication methods as shown in FIG. 28 of the drawings. The primary transceiver 202 is capable of receiving various types of information such as but not limited to animal identification, entry information and exit information. The primary transceiver 202 maybe located at an exit point, middle portion or entry point within the frame.

The animal transponder 200 is in communication with the primary transceiver 202 via various communication methods. The animal transponder 200 is attachable upon an animal which is well established in the animal identification industry. The animal transponder 200 preferably emits an information signal after receiving an initiating signal from the primary transceiver 202. However, the animal transponder 200 may emit an information signal constantly regardless of receiving an initiating signal from the primary transceiver 202

The secondary transceiver 204 is in communication with the computer 100 via various communication methods. The position localizer 206 is in communication with the secondary transceiver 204 via various communication methods. The position localizer 206 emits an information signal after receiving an initiating signal from the secondary transceiver 204. However, the position localizer 206 may emits an information signal regardless of receiving an initiating signal from the secondary transceiver 204. The position localizer 206 is attached to a feed bunk or loading dock or unloading chute other structure/location adjacent to a lot.

Figure 18:
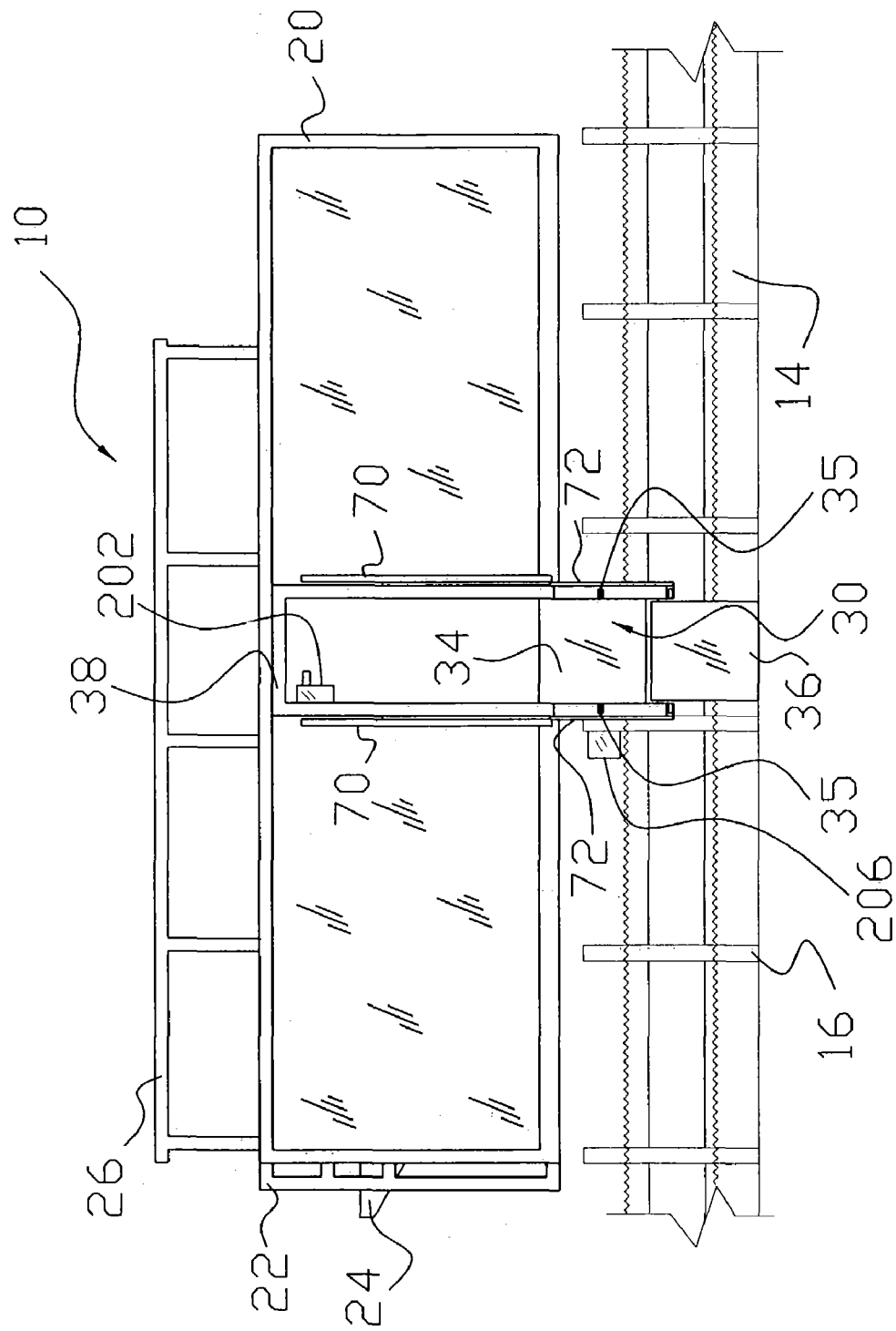
FIG. 18 is a left side view of the present invention showing the ramp, the first doors and the second doors fully extended.

In use, the user positions the side of the animal transportation and tracking system adjacent a feedlot pen or other animal holding area. The user then actuates the control unit 90 so that the first doors 70 are manipulated inwardly toward one another as shown in FIGS. 12 through 14 of the drawings. As best shown in FIG. 7 of the drawings, once the first doors 70 are fully extended outwardly with respect to the frame 20 the ramp 30 is then extended outwardly along a horizontal plane with the distal end of the first portion 32 extending a distance above and beyond a feed bunk 14 and/or fence 16. The guide pins 35 attached to the vertically oriented second portion 34 of the ramp 30 pass through the slots 78 within the engaging rails 76 so that the guide pins 35 are properly positioned within the engaging rails 76. When the pair of first doors 70 are fully extended, the first portion 32 is completely enclosed with the second portion 34 and third portion 36 blocking the front portion of the opening from the frame 20. After the first portion 32 of the ramp 30 is fully extended, the second portion 34 is pivoted outwardly simultaneously having the guide pins 35 slidably extend within the engaging rails 76 and simultaneously pivot the second doors 72 with respect to the first doors 70 as shown in FIG. 15 of the drawings. When the second portion 34 of the ramp 30 is substantially horizontal, the spring 80 begins to force the third portion 36 outwardly from within the second portion 34 of the ramp 30. When the second portion 34 of the ramp 30 is inclined downwardly, the third portion 36 is extended outwardly from the second portion 34 until the distal end of the third portion 36 is in engagement with the ground surface as shown in FIG. 17 of the drawings. The second doors 72 completely surround the second portion 34 and a portion of the third portion 36 of the ramp 30 as shown in FIGS. 17 and 18 of the drawings. The individual then may load or unload animals into the animal transportation and tracking system 10 as desired. During loading or unloading, the animals are guided by the inner doors 60 and inner partitions 60 to the desired location depending upon the position of the inner doors 60. When the individual is finished, the above process is simply reversed until the ramp 30 is returned into the frame 20 and the doors 70, 72 are adjacent the side of the frame 20 as shown in FIG. 1 of the drawings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal transportation and tracking system for managing livestock via a mobile transporting apparatus, comprising:

a frame attached to a truck, said frame including an entry point, an exit point and a plurality of individual pens capable of storing animals;

a computer positioned within said truck;

wherein said computer is capable of receiving animal identification data, an entry location data and an exit location data relating to an animal being loaded or unloaded from said truck;

wherein said computer is capable of generating reports regarding animal entry and animal exit information;

a primary transceiver in communication with said computer;

wherein said primary transceiver is attached to said frame adjacent at said exit point or said entry point of said frame;

wherein said primary transceiver is capable of receiving said animal identification data;

an animal transponder in communication with said primary transceiver, wherein said animal transponder is attached upon an animal, wherein said animal transponder contains said animal identification data for transmitting to said primary transceiver;

a secondary transceiver in communication with said computer, wherein said secondary transceiver is positioned within a lower portion of said frame for receiving said entry data and said exit data; and a position localizer in communication with said secondary transceiver, wherein said position localizer contains said entry data or said exit data relating to an animal holding lot for transmitting to said secondary transceiver, and wherein said position localizer is attached adjacent to said animal holding lot.

* * * * *